(12) United States Patent
Didden et al.

(10) Patent No.: US 10,427,166 B2
(45) Date of Patent: Oct. 1, 2019

(54) TRANSPORTABLE MODULAR SYSTEM FOR ENHANCED MINERAL RECOVERY, FROM TAILINGS LINE AND DEPOSITS

(71) Applicant: CiDRA CORPORATE SERVICES, INC., Wallingford, CT (US)

(72) Inventors: Francis K. Didden, Wallingford, CT (US); Alan D. Kersey, South Glastonbury, CT (US); Mark R. Fernald, Enfield, CT (US); Paul J. Rothman, Windsor, CT (US)

(73) Assignee: CiDRA Corporate Services Inc., Wallingford, CT (US)

( * ) Notice: Subject to any disclaimer, the term of this patent is extended or adjusted under 35 U.S.C. 154(b) by 0 days.

(21) Appl. No.: 15/534,632

(22) PCT Filed: Dec. 17, 2015

(86) PCT No.: PCT/US2015/066390
§ 371 (c)(1),
(2) Date: Jun. 9, 2017

(87) PCT Pub. No.: WO2016/100673
PCT Pub. Date: Jun. 23, 2016

(65) Prior Publication Data
US 2017/0361333 A1    Dec. 21, 2017

Related U.S. Application Data

(60) Provisional application No. 62/093,106, filed on Dec. 17, 2014.

(51) Int. Cl.
*B03B 9/00* (2006.01)
*B01J 20/32* (2006.01)
(Continued)

(52) U.S. Cl.
CPC .............. *B03B 9/00* (2013.01); *B01J 20/327* (2013.01); *B01J 20/3212* (2013.01);
(Continued)

(58) Field of Classification Search
CPC ....................................................... B03B 5/48
(Continued)

(56) References Cited

U.S. PATENT DOCUMENTS 6,216,962 B1 *  4/2001  Krieg ........................ C22B 3/02
239/198
9,839,919 B2 *  12/2017  Davis ........................ B03C 5/02
(Continued)

FOREIGN PATENT DOCUMENTS

RU          2281809 A     2/2006
WO     2009039559 A1     4/2009
(Continued)

OTHER PUBLICATIONS

English language Abstract of RU2281809.

*Primary Examiner* — Terrell H Matthews
(74) *Attorney, Agent, or Firm* — Ware, Fressola, Maguire & Barber LLP

(57) ABSTRACT

A transportable modular system for enhanced minerals recovery from tailings lines and deposits, features two transportable mineral recovery modules (TMRM), each TMRM for transporting as a truck mounted module to a remote site as an independently-operable mineral recovery module, each TMRM to couple to another TMRM on-site at the remote site and used together to provide enhanced minerals recovery. One TMRM having a central engineered polymer mineral recovery module that receives tailings fluid having a mineral particle of interest, processes the tailings fluid using an engineered polymer configuration, and provides recovered mineral processing fluids having the mineral (Continued)

particle of interest and a tailings disposal fluid. One other TMRM is selected from a group of TMRMs that includes another central engineered polymer mineral recovery module, a tailings fluid management module, an additive/chemical treatment polymer management module, a tailings disposal module and a recovery mineral processing module.

53 Claims, 19 Drawing Sheets

(51) Int. Cl.
| | | |
|---|---|---|
| *B03B 1/00* | (2006.01) | |
| *B03D 1/004* | (2006.01) | |
| *B82Y 30/00* | (2011.01) | |
| *C02F 1/28* | (2006.01) | |
| *B03B 5/48* | (2006.01) | |
| *B07B 13/00* | (2006.01) | |
| *C02F 103/10* | (2006.01) | |

(52) U.S. Cl.
CPC ....... *B01J 20/3272* (2013.01); *B01J 20/3285* (2013.01); *B03B 1/00* (2013.01); *B03B 5/48* (2013.01); *B03D 1/004* (2013.01); *B82Y 30/00* (2013.01); *C02F 1/285* (2013.01); *B07B 13/003* (2013.01); *C02F 2103/10* (2013.01); *C02F 2201/007* (2013.01); *C02F 2201/008* (2013.01)

(58) Field of Classification Search
USPC .......................................................... 209/3
See application file for complete search history.

(56) References Cited

U.S. PATENT DOCUMENTS

| | | | |
|---|---|---|---|
| 2010/0260615 A1* | 10/2010 | Anderson | ............. F04B 9/1172 |
| | | | 417/46 |
| 2013/0061719 A1* | 3/2013 | Carlton | ..................... C22B 1/00 |
| | | | 75/414 |

FOREIGN PATENT DOCUMENTS

| | | | | |
|---|---|---|---|---|
| WO | 2013177267 A1 | 11/2013 | | |
| WO | WO-2013177267 A1 * | 11/2013 | ............... | B03C 5/02 |
| WO | 2013188982 A1 | 12/2013 | | |
| WO | WO-2013188982 A1 * | 12/2013 | ............... | B09C 1/08 |
| WO | 2014186352 A1 | 11/2014 | | |

* cited by examiner

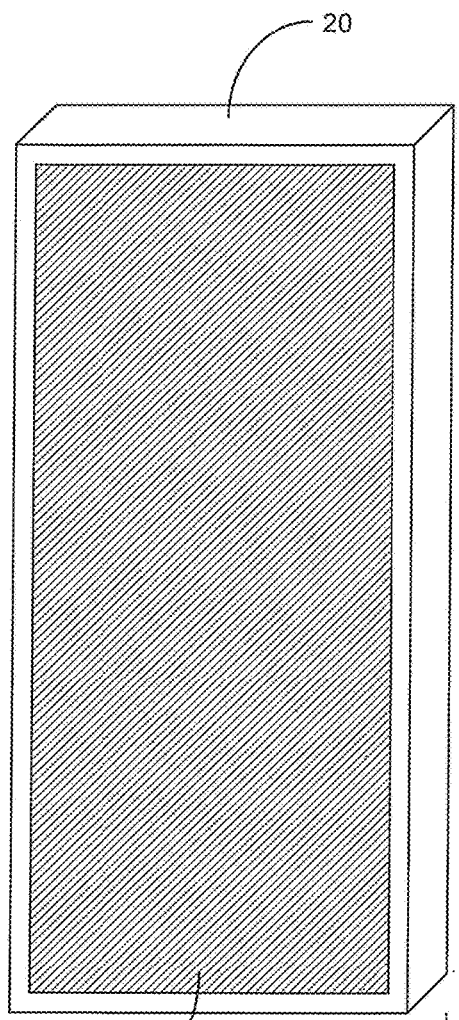
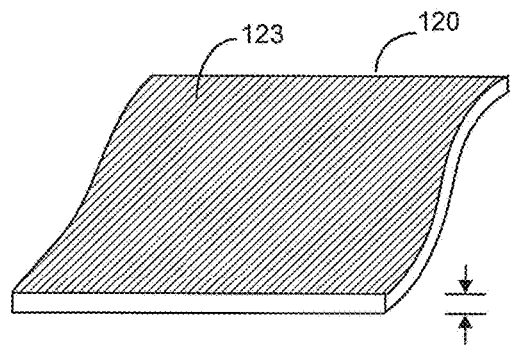
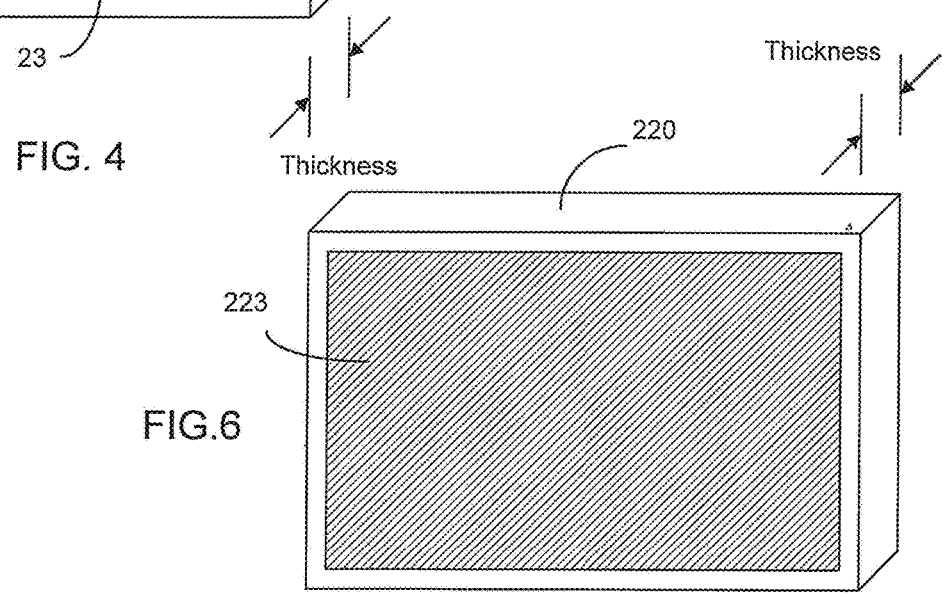

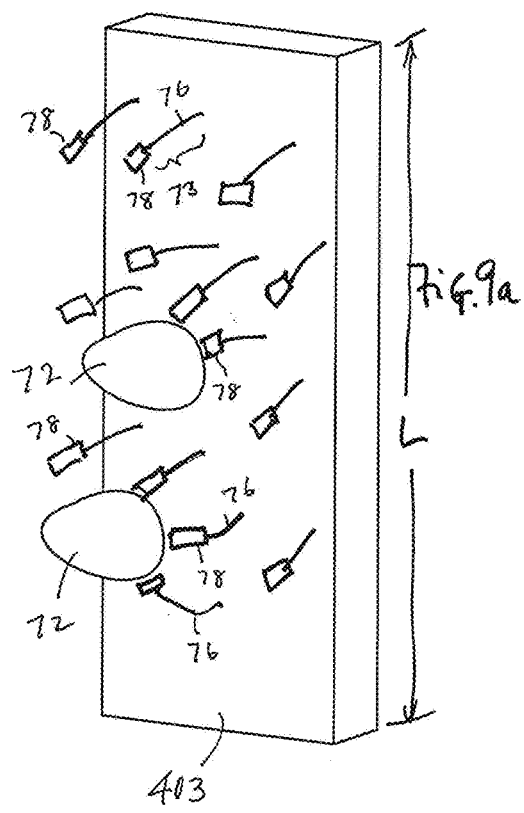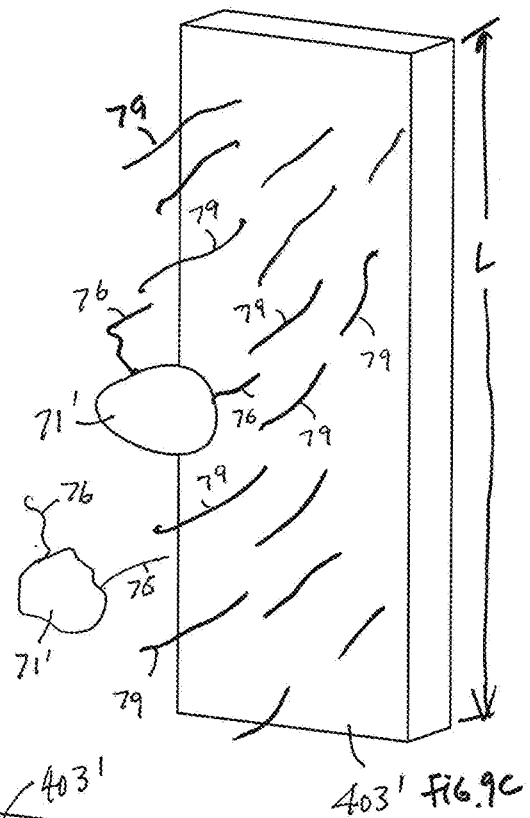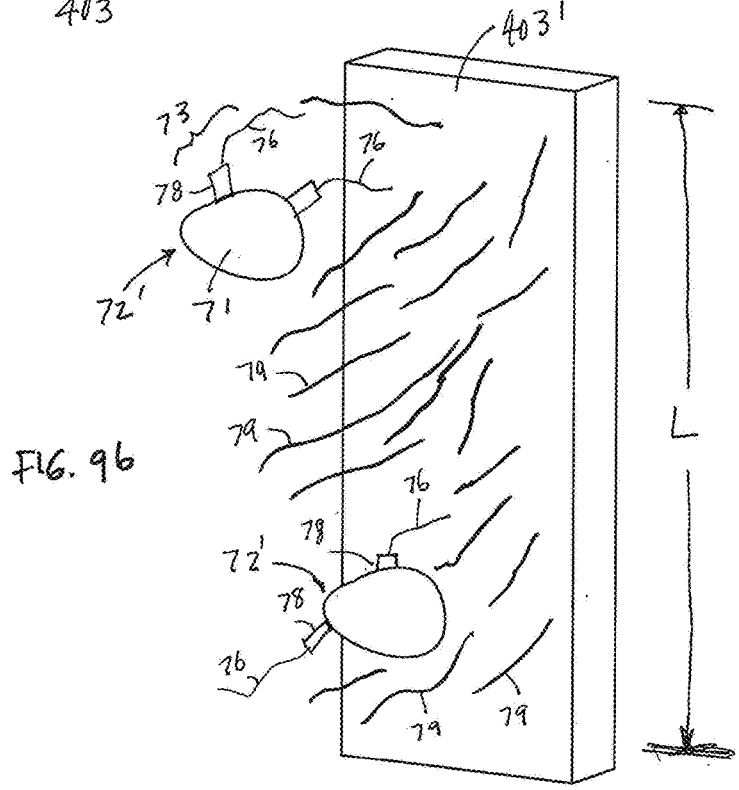

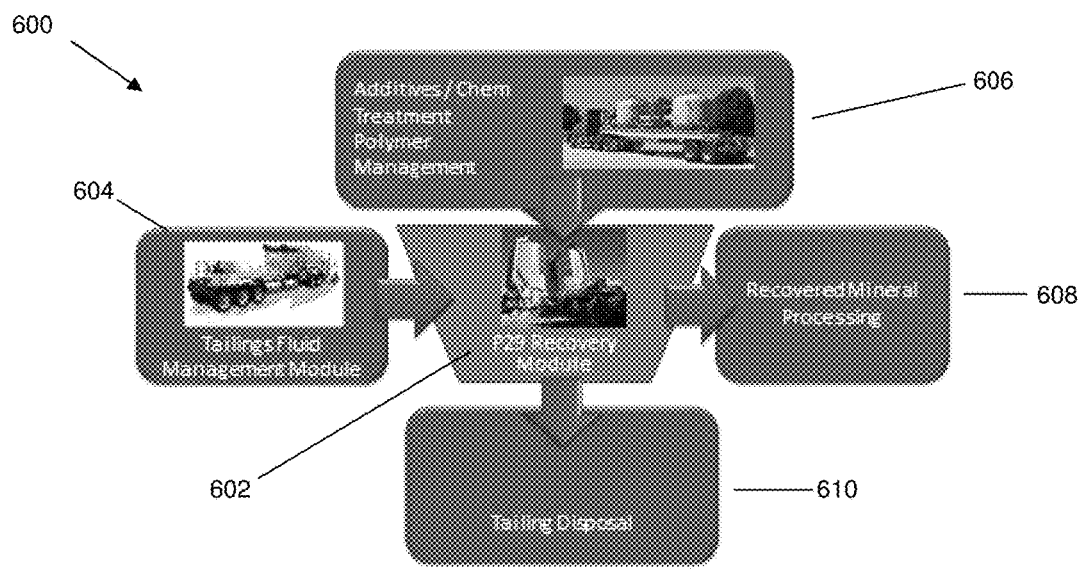
Figure 17a: The concept of a modular system
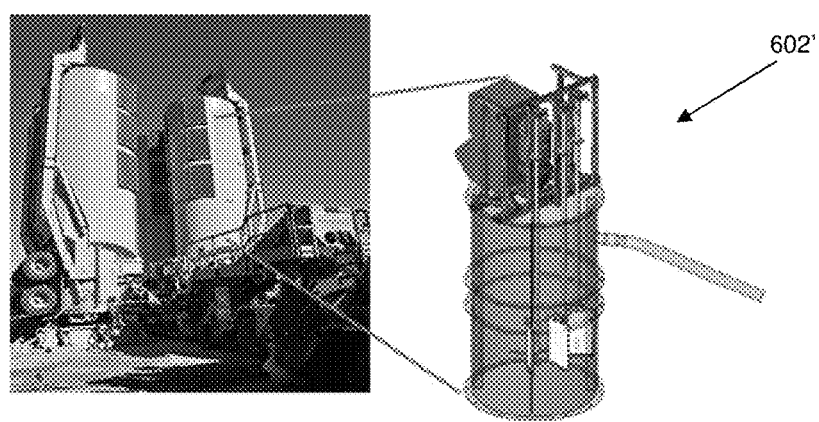
Figure 17b: The engineered-polymer based modular mineral recovery system

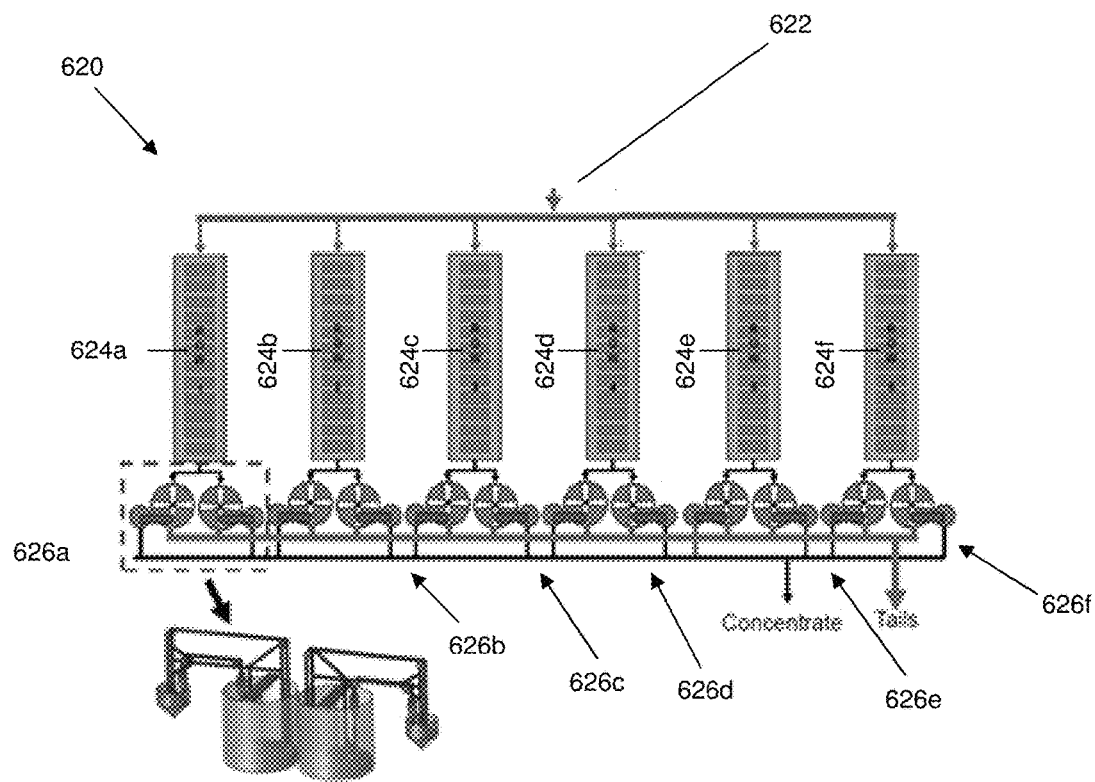
Figure 17c: Modular system added to all 6 rows of a typical beneficiation plant

TRANSPORTABLE MODULAR SYSTEM FOR ENHANCED MINERAL RECOVERY, FROM TAILINGS LINE AND DEPOSITS

CROSS-REFERENCE TO RELATED APPLICATION

This application claims benefit to provisional patent application Ser. No. 62/093,106, filed 17 Dec. 2014, which is hereby incorporated by reference in its entirety.

This application is also related to a family of nine PCT applications, which were all concurrently filed on 25 May 2012, as follows:

- PCT application no. PCT/US12/39528, entitled "Flotation separation using lightweight synthetic bubbles and beads;"
- PCT application no. PCT/US12/39524, entitled "Mineral separation using functionalized polymer membranes;"
- PCT application no. PCT/US12/39540, entitled "Mineral separation using sized, weighted and magnetized beads;"
- PCT application no. PCT/US12/39576, entitled "Synthetic bubbles/beads functionalized with molecules for attracting or attaching to mineral particles of interest;"
- PCT application no. PCT/US12/39591, entitled "Method and system for releasing mineral from synthetic bubbles and beads;"
- PCT application no. PCT/US/39596, entitled "Synthetic bubbles and beads having hydrophobic surface;"
- PCT application no. PCT/US12/39631, entitled "Mineral separation using functionalized filters and membranes,"
- PCT application no. PCT/US12/39655, entitled "Mineral recovery in tailings using functionalized polymers;" and
- PCT application no. PCT/US12/39658, entitled "Techniques for transporting synthetic beads or bubbles In a flotation cell or column,"

all of which are incorporated by reference in their entirety.

This application also related to PCT application no. PCT/US13/28303, filed 28 Feb. 2013, entitled "Method and system for flotation separation in a magnetically controllable and steerable foam," which is also hereby incorporated by reference in its entirety.

This application also related to PCT application no. PCT/US14/37823, filed 13 May 2014, entitled "Polymer surfaces having siloxane functional group," which claims benefit to U.S. patent application Ser. No. 14/890,477, filed 11 Nov. 2014, which is also hereby incorporated by reference in its entirety.

BACKGROUND OF THE INVENTION

1. Technical Field

This invention relates generally to a method and apparatus for separating valuable material from unwanted material in a mixture, such as a pulp slurry.

2. Background of the Invention

Mining processing for mineral deposits such as copper and other precious metals results in 'waste' ore stream 'outputs' which are typically fed to storage areas termed tailings basins or ponds. Due to the limited ability of a given beneficiation processing plant to recover all the valuable mineral deposits in the mined ore, valuable residual amounts of metal ore are also sent to the tailings along with the waste ore (gangue). This waste factor can range between 5 to 15% of the total mineral deposit in the ore depending on the original grade of the incoming ore from the mine, the metallurgical state of the deposit, geological factors, and the overall throughput of the plant.

To recover more of the valuable mineral bearing ore at the same throughput (tons/ore processed/hour), improvements can be made to the recovery circuit, but these improvements result in appreciable plant capital expenditure (Capex) costs. Furthermore, as a typical beneficiation processing plant will comprise multiple 'rows' of parallel processing, e.g., such as 6 rows, any new equipment addition to one the lines has to have a capability to process $\frac{1}{6}^{th}$ of the total mine throughput. This increases the Capex risk of such an expansion project, should the payoff not be as clear cut as desired, as may be the case in a 'pilot phase' test of a new or improved approach/new technology. Additionally, the installation of such new equipment can incur down-time of a row to make modifications/engineering changes, this reducing overall plant throughput for a given period.

SUMMARY OF THE INVENTION

Based on the above operational concerns, it is desirable to have an approach to providing incremental additional beneficiation processing capability in a flexible manner that provides a capacity 'on-demand'. The present invention provides such an approach for the addition of beneficiation processing on a flexible modular basis, utilizing a new form of mineral separation utilizing 'engineered polymers,' e.g., consistent with that set forth in the aforementioned family of applications.

At Least One Transportable Mineral Recovery Module

According to some embodiments, the present invention may take the form of a transportable modular system for enhanced minerals recovery from tailings lines and deposits, featuring at least one transportable mineral recovery module, the transportable mineral recovery module configured for transporting as a truck mounted module to a remote site as an independently-operable mineral recovery module, the transportable mineral recovery module configured to couple on-site to mineral recovery equipment that forms part of a beneficiation processing system at the remote location and to provide enhanced minerals recovery; and the transportable mineral recovery module selected from a group of transportable mineral recovery modules that consists of a central engineered polymer mineral recovery module, a tailings fluid management module, an additive/chemical treatment polymer management module, a recovery mineral processing module and a tailings disposal module. Such a transportable modular system may also include one or more of the features set forth herein.

At Least Two Transportable Mineral Recovery Modules

According to some embodiments, the present invention may also take the form of a transportable modular system for enhanced minerals recovery from tailings lines and deposits, featuring at least two transportable mineral recovery modules, each transportable mineral recovery module configured for transporting as a truck mounted module to a remote site as an independently-operable mineral recovery module, each of the at least two transportable mineral recovery modules configured to couple to another one of the at least two transportable mineral recovery module on-site at the remote site and used together to provide enhanced minerals recovery; and the at least two transportable mineral recovery modules selected from a group of transportable mineral recovery modules that consists of a central engineered polymer mineral recovery module, a tailings fluid management module, an additive/chemical treatment polymer management module, a recovery mineral processing module and a tailings disposal module. Such a transportable modular system may also include one or more of the features set forth herein.

According to some embodiments of the present invention, the present invention may include, or take the form of a transportable modular system for enhanced minerals recovery from tailings lines and deposits, featuring:

at least two transportable mineral recovery modules, each transportable mineral recovery module configured for transporting as a truck mounted module to a remote site as an independently-operable mineral recovery module, each of the at least two transportable mineral recovery modules configured to couple to another one of the at least two transportable mineral recovery module on-site at the remote site and used together to provide enhanced minerals recovery;

at least one of the at least two transportable mineral recovery modules comprising at least one central engineered polymer mineral recovery module configured to receive tailings fluid having a mineral particle of interest, process the tailings fluid using an engineered polymer configuration, and provide recovered mineral processing fluids having the mineral particle of interest and a tailings disposal fluid; and the at least two transportable mineral recovery modules comprising at least one other transportable mineral recovery module selected from a group of transportable mineral recovery modules that includes another central engineered polymer mineral recovery module, a tailings fluid management module, an additive/chemical treatment polymer management module, a tailings disposal module and a recovery mineral processing module.

The transportable modular system may include one or more of the following other features:

Each of the at least two transportable mineral recovery modules may be configured as a respective plug-and-play transportable mineral recovery module for interconnecting and cooperating together to provide the enhanced minerals recovery.

Tailings Fluid Management Module

The tailings fluid management module may be configured to provide the tailings fluid to the at least one central engineered polymer mineral recovery module.

The tailings fluid management module may include some combination of at least one pump or at least one pre-conditioner module.

The at least one pump may be configured to provide the tailing fluid from a tailing pond or reservoir to the at least one central engineered polymer mineral recovery module.

The at least one pre-conditioner module may be configured to pre-condition the tailing fluid before the tailings fluid is provided to the at least one central engineered polymer mineral recovery module.

The Additive/Chemical Treatment Polymer Management Module

The additive/chemical treatment polymer management module may include at least one chemical storage vessel configured to provide at least one chemical to the at least one central engineered polymer mineral recovery module.

The at least one chemical may include at least one chemical polymer, or at least one chemical additive, or at least one polymer reactivation, or some combination thereof.

The Recovery Mineral Processing Module

The recovery mineral processing module may be configured to receive the recovered mineral processing fluids having the mineral particle of interest for further processing.

The recovery mineral processing module may include a recovered mineral processing fluids storage vessel to receive and store the recovered mineral processing fluids for further processing.

The recovery mineral processing module may be configured for transporting from the remote site with the recovered mineral processing fluids contained in the recovered mineral processing fluids storage vessel for further processing off-site at another location, including at a main plant.

The Tailings Disposal Module

The tailings disposal module may be configured to receive the tailings disposal fluid for tailings disposal.

The tailings disposal module may include a pump configured to provide the tailings disposal fluid for tailings disposal.

The tailings disposal module may include a tailings disposal storage vessel to receive and store the tailings disposal fluid for tailings disposal.

The tailings disposal module may be configured for transporting from the remote site with the tailings disposal fluid contained in the tailings disposal storage vessel for tailings disposal off-site at another location.

The Engineered Polymer Configuration

According to some embodiments, and by way of example, the engineered polymer configuration may include, or take the form of, one or more of the following:

The engineered polymer configuration may include a synthetic bead having a solid-phase body made of a synthetic material, the solid phase body comprising a surface; and a coating attached to at least part of the surface, the coating comprising a plurality of molecules selected for attracting one or more mineral particles to the molecules, wherein the molecules comprise a functional group in a hydrophobic polymer selected from a group consisting of poly(dimethylsiloxane), polysiloxanates, silicone alkyd copolymer and fluoroalkylsilane.

The engineered polymer configuration may include apparatus having a collection area comprising collection surfaces configured to contact with a mixture comprising water and valuable material, the valuable material comprising a plurality of mineral particles; and a synthetic material provided at least on the collection surfaces, the synthetic material comprises plurality of molecules comprising a functional group configured to attract the mineral particles to the collection surfaces, wherein the functional group is configured to render the collection surfaces hydrophobic and wherein the synthetic material comprises a siloxane derivative. Moreover, according to some embodiments, the siloxane derivative may include either polydimethylsiloxane or polysiloxanates or hydroxyl-terminated polydimethylsiloxanes; and the synthetic material may be selected from a group consisting of hydrophobically-modified ethyl hydroxyethyl cellulose polysiloxanates, alkylsilane and fluoroalkylsilane.

The engineered polymer configuration may include apparatus having a collection area or tank having one or more collection surfaces configured to contact with a mixture having water and valuable material, the valuable material having a plurality of mineral particles of interest; and a synthetic material provided at least on the one or more collection surfaces, the synthetic material having plurality of molecules with a siloxane functional group configured to attract the mineral particles of interest to the collection surfaces.

The engineered polymer configuration may be made of polyurethane rubber and coated with a silicone gel for collecting the material particle of interest of a wide range of sizes, including particles far larger than about 500 microns.

After being coated on the polyurethane rubber, the silicone gel cures and hardens to as to form part of, and stick to, the polyurethane rubber.

The silicone gel may include, or take the form of, molecules having the siloxane functional group, including a siloxane that is, or takes the form of, a functional group in organosilicon chemistry with the Si—O—Si linkage.

Parent siloxanes may include, or take the form of, oligomeric and polymeric hydrides with the formulae $H(OSiH_2)_nOH$ and $(OSiH_2)_n$.

The siloxane may include branched compounds, where the defining feature includes each pair of silicon centers being separated by one oxygen atom.

The silicone gel may take the form of a product sold in a combination that includes 3-4222 Dielectric Firm Gel Part A and 3-4222 Dielectric Firm Gel Part B. The gel may come with two parts, including:
Part A that includes dimethyl siloxane, dimethylvinyl-terminated—68083-19-2; polydimethylsiloxane—63148-62-9; reaction of ethylene glycol and silica—170424-65-4; hydrotreated light naphthenic petroleum distillate—64742-53-6; and
Part B that includes dimethyl siloxane, dimethylvinyl-terminated—68083-19-2; polydimethylsiloxane—63148-62-9; dimethyl siloxane, hydrogen-terminated—none; trimethylated silica—68909-20-6; dimethyl, methylhydrogen siloxane—68037-59-2.

The silicon gel may be configured or made substantially of a material that consists of a siloxane-based material in a non-gel form.

The engineered polymer configuration may include, or take the form of, a group consisting of some combination of: an engineered bead or bubble, a conveyor belt, one or more of an impeller, a filter assembly and/or a flat plate.

The engineered polymer configuration may include a collection surface functionalized to be hydrophobic so as to provide a bonding between the collection surface and the mineral particle of interest that is hydrophobic.

The engineered polymer configuration may include a collection surface made of a polymer and coated with a silicone gel to provide the siloxane functional group.

The polymer may be naturally hydrophobic or functionalized to be hydrophobic.

The polymer may be a hydrophobic polymer, including a polydimethylsiloxane.

The collection surface may be rendered hydrophobic by having a coating that contains chemicals with a siloxane functional group.

The collection surface may be coated with hydrophobic silicone polymer including polysiloxane so that the collection surface becomes hydrophobic.

The collection surface may include polymer surfaces and the synthetic material comprise a siloxane derivative.

The synthetic material may include polysiloxanes.

The synthetic material may include one or more of dimethyl siloxane, dimethylvinyl-terminated; polydimethylsiloxane; and dimethyl, methylhydrogen siloxane.

The synthetic material may include hydroxyl-terminated polydimethylsiloxanes.

The polymer surfaces may include polyurethane.

The engineered polymer configuration may include a collection surface having a polymer selected from a group consisting of polyamides, polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, and polydimethylsiloxane.

The engineered polymer configuration may include a collection surface having a polymer from a group consisting of polystyrene, poly(d,l-lactide), poly(dimethylsiloxane), polypropylene, polyacrylic, polyethylene, hydrophobically-modified ethyl hydroxyethyl cellulose polysiloxanes, alkylsilane and fluoroalkylsilane.

Each transportable mineral recovery module may include a respective transportable frame or structure coupled thereto.

Each transportable mineral recovery module may include one or more frame-to-transportable-mineral-recovery-module coupling members configured for coupling together the respective transportable frame or structure to a corresponding transportable mineral recovery module.

The one or more frame-to-transportable-mineral-recovery-module coupling members may be configured as a rigid structure like mounting bars, tubes or rods that securely couple some part of the respective transportable frame or structure to some part of the corresponding transportable mineral recovery module.

The rigid structure may be configured as one or more removable or non-removable fastening mounting bars, tubes or rods, e.g., by either detachably fastening or welding the mounting bars, tubes or rods between some part of the transportable frame or structure and some part of the transportable mineral recovery module.

Advantages

The present invention provides an approach to allow incremental additional beneficiation processing capability in a flexible manner that provides a capacity 'on-demand' so as to address the problems set forth re the aforementioned operational concerns in the prior art. By way of example, one or more transportable mineral recovery modules can be trucked to a remote site where a pre-existing beneficiation processing plant or system is operating that needs to increase its tailings processing, installed into the pre-existing beneficiation processing plant or system while keeping overall system downtime to a minimum, later removed from the pre-existing beneficiation processing plant or system if tailings processing can be decreased again while keeping overall system downtime to a minimum. By way of further example, two or more transportable mineral recovery modules can be trucked to a remote site to configure a beneficiation processing plant or system to provide temporary tailings processing, e.g., at a tailings basin or pond at some remote location, installed or configured together to provide the temporary tailings processing, and disassembled and removed from the remote site once the temporary tailings processing is complete. In both cases, the use of one or more of the transportable mineral recovery modules affords the user new and unique flexibility in relation to expanding and/or contracting its tailings processing in an on-demand manner as tailings processing requirement change due to market conditions.

BRIEF DESCRIPTION OF THE DRAWING

Referring now to the drawing, which are not necessarily drawn to scale, the foregoing and other features and advantages of the present invention will be more fully understood from the following detailed description of illustrative embodiments, taken in conjunction with the accompanying drawing in which like elements are numbered alike:

FIG. 1a is a side partial cutaway view in diagram form of a separation processor configured with two chambers, tanks or columns having a functionalized polymer coated impeller arranged therein according to some embodiments of the present invention, and includes FIG. 1b is a top partial cross-sectional view in diagram form of a functionalized polymer coated impeller moving in an attachment rich environment contained in an attachment chamber, tank or column and also moving in a release rich environment contained in a release chamber, tank or column according to some embodiments of the present invention.

FIG. 4 is an illustration of a surface of an impeller according to some embodiments of the present invention.

FIG. 5 is an illustration of a section of a conveyor belt according to some embodiments of the present invention.

FIG. 6 is an illustration of a filter according to some embodiments of the present invention.

FIG. 9a illustrates a plurality of functional groups attached to surfaces for attracting mineral particles, according to some embodiments of the present invention.

FIG. 9b illustrates a plurality of hydrophobic molecules attached to surfaces for attracting mineral particles, according to some embodiments of the present invention.

FIG. 9c illustrates a plurality of hydrophobic molecules attached to surfaces for attracting non-mineral particles, according to some embodiments of the present invention.

FIG. 17a shows a transportable modular system according to some embodiments of the present invention.

FIG. 17b shows an engineered polymer mineral recovery module that may form part of the transportable modular system shown in FIG. 17a, according to some embodiments of the present invention.

FIG. 17c shows an engineered polymer mineral recovery module that may be added to a typical beneficiation processing plant, according to some embodiments of the present invention.

DETAILED DESCRIPTION OF THE INVENTION

Figure 1:
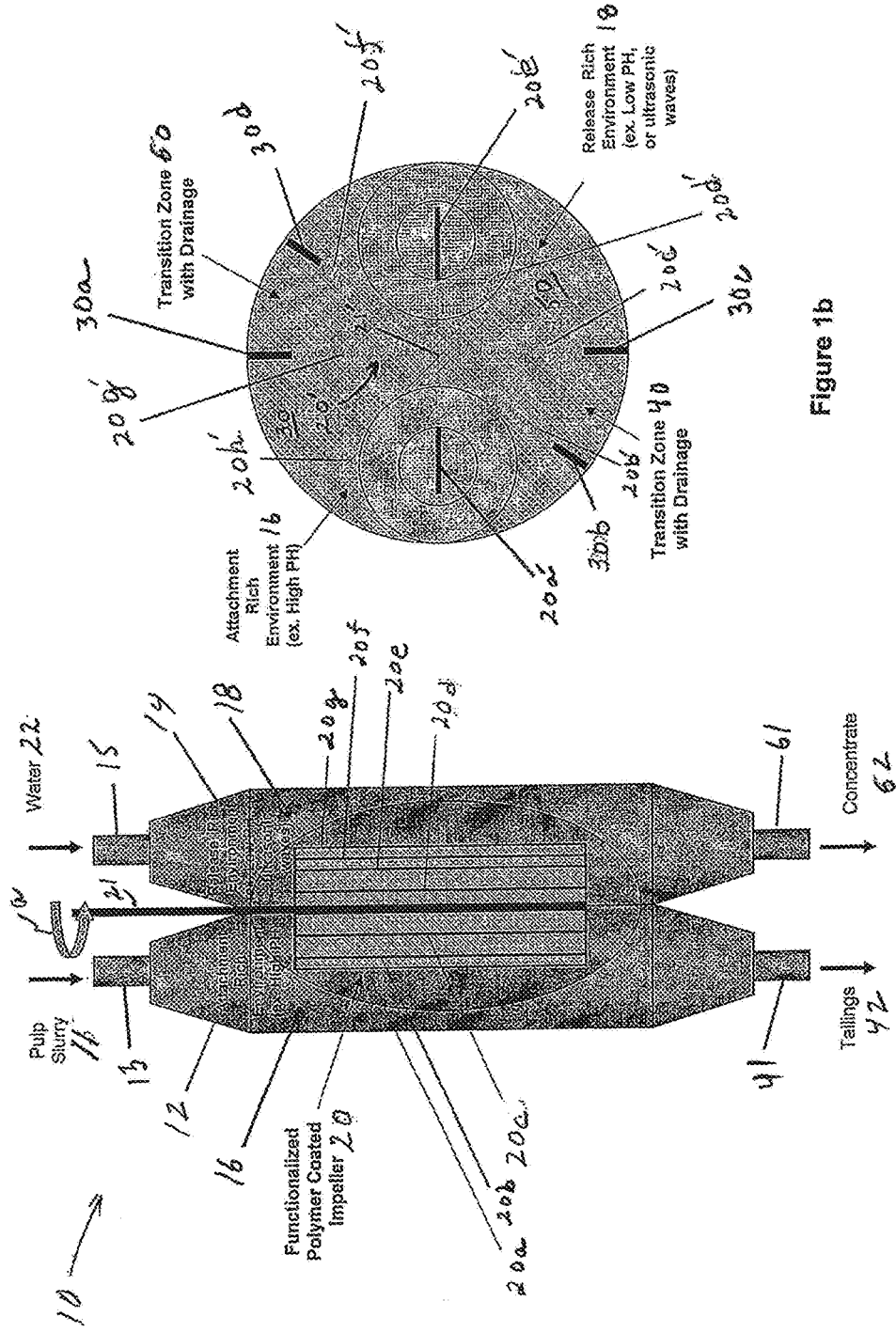
FIG. 1 includes

FIGS. 17a-17d illustrate the underlying technique according to some embodiments of the present invention.

For example, FIG. 17a shows a transportable modular system generally indicated as 600 for enhanced minerals recovery from tailings lines and deposits, e.g., that includes a group of transportable mineral recovery modules.

Each transportable mineral recovery module or element of the transportable modular system 600 can be transported as a truck mounted mineral recovery module, such that each transportable mineral recovery module is configured on-site, where and as needed, and the transportable mineral recovery modules are interconnected to provide the enhanced recovery capability. These transportable mineral recovery modules include, but are not limited to:

a central engineered polymer recovery module 602;

A tailing fluid management system module 604, which may include pumps, pre-conditioning, or other tailing fluid processing steps, etc.;

A chemical, polymer storage vessel 606 (aka "an additive/chemical treatment polymer management module) for provisioning chemical additives, polymer reactivation, etc., to the central engineered polymer recovery module 602;

A recovery mineral processing module 608 for processing recovery minerals for further processing, e.g., at an alternative site, such as the main plant (e.g., smelting, etc.); and Additional modules 610 (aka tailings disposal module for tailings disposal), e.g., including pumps, etc.

According to some embodiments of the present invention, the transportable modular system 600 may include, or take the form of, at least two of the aforementioned transportable mineral recovery modules, where each transportable mineral recovery module is configured for transporting as a truck mounted mineral recovery module to a remote site as an independently-operable mineral recovery module, and where each of the at least two transportable mineral recovery modules is configured to couple to another one of the at least two transportable mineral recovery module on-site at the remote site and used together to provide enhanced minerals recovery.

According to some embodiments of the present invention, at least one of the at least two transportable mineral recovery modules includes at least one central engineered polymer mineral recovery module 602, e.g., that is configured to receive tailings fluid having a mineral particle of interest, process the tailings fluid using an engineered polymer configuration, and provide recovered mineral processing fluids having the mineral particle of interest and a tailings disposal fluid. See FIG. 17b, element 602'.

According to some embodiments of the present invention, the at least two transportable mineral recovery modules may also include at least one other transportable mineral recovery module selected from the group of transportable mineral recovery modules, e.g., such as another central engineered polymer mineral recovery module 602, the tailings fluid management module 604, the additive/chemical treatment polymer management module 606, the recovery mineral processing module 608 and/or the tailings disposal module 610.

The engineered polymer configuration may include using any one of the techniques disclosed herein, e.g., as described in relation to FIGS. 1 through 16b. By way of example, the engineered polymer configuration may include, or take the form of, using engineered polymer bubble or beads, polymer filters, a polymer impeller arrangement, a polymer conveyor belt arrangement or a polymer flat plate arrangement.

By way of example, FIG. 17c shows at least part of a typical beneficiation processing plant 620 having input piping 622, e.g., for receiving the tailings fluid; and having 6 rows of beneficiation processing units 624a, 624b, 624c, 624d, 624e and 624f for processing the tailings fluid. As shown, one or more of the beneficiation processing units 624a, 624b, 624c, 624d, 624e and 624f may be configured with a transportable mineral recovery module 626a, 626b, 626c, 626d, 626e, 626f, e.g., which did not form part of the original beneficiation processing plant 620, but was later added onto the beneficiation processing plant 620, after being trucked to the beneficiation processing plant 620 as a transportable mineral recovery module according to the present invention and installed or integrated into the beneficiation processing plant 620. In FIG. 17c, the transportable mineral recovery module 626a, 626b, 626c, 626d, 626e, 626f may take the form of a central engineered polymer mineral recovery module as indicated by reference numerals 602 (FIG. 17a), 602' (FIG. 17b), which each receives the tailings fluid having the mineral particle of interest, processes the tailings fluid using the engineered polymer configuration, and provides recovered mineral processing fluids in the form of "concentrate" having the mineral particle of interest and also provides the tailings disposal fluid in the form of "tails."

Figure 17D:
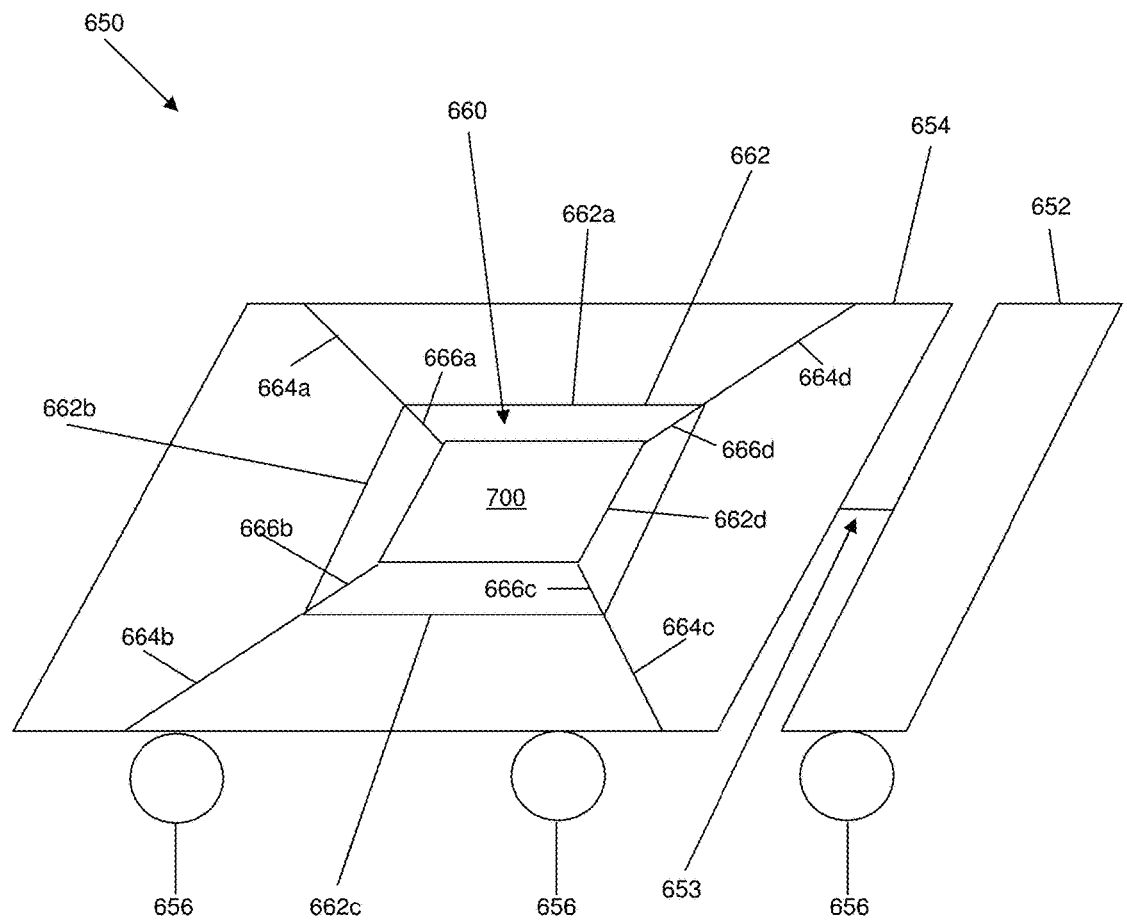
FIG. 17d shows a schematic illustration of a flat bed truck having a transportable mineral recovery module mounted thereon for trucking to a remote site.

According to some embodiments of the present invention, each truck mounted mineral recovery module may be configured as, or take the form of, a respective transportable frame or structure 650 in structural combination with a respective transportable mineral recovery module generally indicated as 700. Each truck mounted mineral recovery module is configured as a "plug and play" module, e.g., for installing or connecting either to another truck mounted mineral recovery module or into a pre-existing beneficiation processing system or plant. Each truck mounted mineral recovery module is pre-constructed at a manufacturing facility to implement its intended mineral recovery functionality, e.g., then trucked from the manufacturing facility or some other distribution point to the remote site as the "plug and play" module. According to some embodiments, only input and output portings may be needed to install a particular truck mounted mineral recovery module. For example, an output porting of either the tailings fluid management module 604, or the additive/chemical treatment polymer management module 606, may be coupled on-site to an input porting of the central engineered polymer mineral recovery module, e.g., with few, if any, other connections. The transportable frame or structure 650 may be used to structurally contain and transport each transportable mineral recovery module 700, which may be safely and securely trucked to the remote site consistent with that set forth below:

By way of example, FIG. 17d shows a flatbed truck generally indicated as 650 having a cab portion 652, a bed portion 654 and wheels 656. The cab portion 652 and bed portion 654 are coupled together, e.g., using a detachable hitch arrangement generally indicated 653. Flatbed trucks like element 650 and detachable hitch arrangement like element 653 are known in the art, and the scope of the invention is not intended to be limited to any particular type or kind thereof. The scope of the invention is also not intended to be limited to the type or kind of flatbed truck, cab portion, bed portion, and is intended to include flatbed trucks, cab portions, bed portions that are now known or later developed in the future.

FIG. 17d also shows the transportable frame or structure 660 arranged on the bed portion 654. The transportable frame or structure 660 includes a base frame portion 662 having four rectangular side frame portions 662a, 662b, 662c, 662d. Although the transportable frame or structure 660 is shown by way of example, as being rectangular, the scope of the invention is intended to include, and embodiments are envisioned where, the transportable frame or structure 660 has other shapes or configurations, such a circle shape or configuration, a pentagonal shape or configuration, a hexagonal shape or configuration, etc.

According to some embodiments, the transportable frame or structure 660 may be configured with one or more frame-to-flat-bed coupling members indicated schematically by reference numerals 664a, 664b, 664c, 664d, e.g., for coupling some part of the transportable frame or structure 660 to some part of the flat bed 654. By way of example, the one or more frame-to-flat-bed coupling members 664a, 664b, 664c, 664d may include, or take the form of, belts, straps, fasteners, or other types or kinds of tie downs, e.g., that securely couple some part of each corner or side to some part of the surface of the flat bed 654. The scope of the invention is intended to include, and embodiments are envisioned where, the one or more frame-to-flat-bed coupling members 664a, 664b, 664c, 664d include, or take the form of, a bolting configuration or arrangement, e.g., where a bolt passed through some part of each corner or side and is screwed or threaded into some corresponding threaded configuration or arrangement in some part of the surface of the flat bed 654. In effect, the scope of the invention is not intended to be limited to any particular way of detachably coupling the transportable frame or structure 660 to the flat bed 654, and is intended to include other types or kinds of ways that are both now known and later developed in the future for securely fastening equipment to the surface of a flatbed truck in order to safely and securely truck the equipment from one location to another location.

According to some embodiments, the transportable frame or structure 660 may be configured with one or more frame-to-transportable-mineral-recovery-module coupling members indicated schematically by reference numerals 666a, 666b, 666c, 666d, e.g., for coupling the transportable frame or structure 660 to the transportable mineral recovery module 700. By way of example, the one or more frame-to-transportable-mineral-recovery-module coupling members 662a, 662b, 662c, 662d may include, or take the form of, rigid structures like mounting bars, tubes or rods, e.g., that securely couple some part of each corner or side of the transportable frame or structure 660 to some part of the transportable mineral recovery module 700. According to some embodiment, this coupling or attachment may be detachable, e.g., by removably fastening mounting bars, tubes or rods between some part of each corner or side of the transportable frame or structure 660 and some part of the transportable mineral recovery module 700. Alternatively, according to some embodiment, this coupling or attachment may be rigid, e.g., by welding mounting bars, tubes or rods between some part of each corner or side of the transportable frame or structure 660 and some part of the transportable mineral recovery module 700. In effect, the scope of the invention is not intended to be limited to any particular way of detachably coupling the transportable frame or structure 660 to the transportable mineral recovery module 700, and is intended to include other types or kinds of ways that are both now known and later developed in the future for securely fastening the transportable frame or structure 660 and the transportable mineral recovery module 700 in order to safely and securely load each truck mounted mineral recovery module onto the flat bed, truck each truck mounted mineral recovery module from some location to the remote site, unload each truck mounted mineral recovery module off the flat bed, install each truck mounted mineral recovery module at the remote site, uninstall each truck mounted mineral recovery module at the remote site, re-load each truck mounted mineral recovery module back onto the flat bed, truck each truck mounted mineral recovery module from the remote site, unload each truck mounted mineral recovery module off the flat bed after returning from the remote site, which may be done over-and-over again throughout the life cycle of each truck mounted mineral recovery module.

Moreover, according to some embodiment, and by way of further example, the transportable frame or structure 660 may be configured as a cube-like framed structure, e.g., having a corresponding top frame portion (not shown) having four corresponding rectangular side frame portions (not shown) and also having vertically-extending rectangular frame portions (not shown) connecting corners or sides of the base frame portion 662 to corresponding corners or sides of the top frame portion. According to some embodiment, and by way of further example, the transportable frame or structure 660 and the transportable mineral recovery module 700 may be coupled together at the bottom, at the top and/or at intermediate place inbetween, so as to securely fasten together the transportable frame or structure 660 and the transportable mineral recovery module 700. Such a cube-like framed structure may be used for securely fastening the transportable frame or structure 660 and the transportable mineral recovery module 700 in order to safely and securely load each truck mounted mineral recovery module onto the flat bed, truck each truck mounted mineral recovery module from some location to the remote site, unload each truck mounted mineral recovery module off the flat bed, install each truck mounted mineral recovery module at the remote site, uninstall each truck mounted mineral recovery module at the remote site, re-load each truck mounted mineral recovery module back onto the flat bed, truck each truck mounted mineral recovery module from the remote site, unload each truck mounted mineral recovery module off the flat bed after returning from the remote site, which may be done over-and-over again throughout the life cycle of each truck mounted mineral recovery module.

The remaining FIGS. 1 to 16b show the subject matter of the aforementioned PCT application no. PCT/US12/39631 and PCT/US14/37823, as follows:

FIGS. 1 to 15b

This part of the application describes the subject matter of FIGS. 1 to 15b of the aforementioned PCT application no. PCT/US12/39631, as follows:

FIGS. 1, 1a, 1b

By way of example, FIG. 1 shows the present invention is the form of a machine, device, system or apparatus 10, e.g., for separating valuable material from unwanted material in a mixture 11, such as a pulp slurry, using a first processor 12 and a second processor 14. The first processor 12 and the second processor 14 are configured with a functionalized polymer coated member that is shown, e.g., as a functionalized polymer coated impeller 20 (FIG. 1a), 20' (FIG. 1b), according to some embodiments of the present invention. In operation, the impeller 20, 20' slowly rotates in relation to the first processor 12 and the second processor 14, the impeller blades slowly pass through the attachment rich environment 16 in the first processor 12 where the valuable material is attached to the blades and through the release rich environment 18 in the second processor 14. is released from the blades. By way of example, the impeller 20 is shown rotating in a counterclockwise direction as indicated by arrow a, although the scope of the invention is not intended to be limited to the direction of the impeller rotation, or the manner in which the functionalized polymer coated impeller 20 (FIG. 1a), 20' (FIG. 1b) is arranged, mounted, or configured in relation to the first processor 12 and the second processor 14.

The first processor 12 may take the form of a first chamber, tank, cell or column that contains an attachment rich environment generally indicated as 16. The first chamber, tank or column 12 may be configured to receive via piping 13 the mixture or pulp slurry 11 in the form of fluid (e.g., water), the valuable material and the unwanted material in the attachment rich environment 16, e.g., which has a high pH, conducive to attachment of the valuable material. The second processor 14 may take the form of a second chamber, tank, cell or column that contains a release rich environment generally indicated as 18. The second chamber, tank, cell or column 14 may be configured to receive via piping 15, e.g., water 22 in the release rich environment 18, e.g., which may have a low pH or receive ultrasonic waves conducive to release of the valuable material. Attachment rich environments like that forming part of element environment 16 conducive to the attachment of a valuable material of interest and release rich environments like that forming part of environment 18 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 16 and a corresponding release rich environment like environment 18 based on the separation technology disclosed herein for any particular valuable mineral of interest, e.g., copper, forming part of any particular mixture or slurry pulp.

In operation, the first processor 12 may be configured to receive the mixture or pulp slurry 11 of water, valuable material and unwanted material and the functionalized polymer coated member that is configured to attach to the valuable material in the attachment rich environment 16. In FIG. 1, the functionalized polymer coated member is shown as the functionalized polymer coated impeller 20 (FIG. 1a), 20' (FIG. 1b). In FIG. 1a, the functionalized polymer coated impeller 20 has a shaft 21 and at least one impeller blade 20a, 20b, 20c, 20d, 2e, 20f, 20g and is configured to rotate slowly inside the first processor 12 and the second processor 14. In FIG. 1b, the functionalized polymer coated impeller 20' has a shaft 21' and impeller blades 20a', 20b', 20c', 20d', 2e', 20f', 20g' and 20h'. Each impeller blade in FIG. 1 is understood to be configured and functionalized with a polymer coating to attach to the valuable material in the attachment rich environment 16. (The scope of the invention is not intended to be limited to the number of blades on the impeller 20, 20' and the embodiment in FIGS. 1a and 1b is shown with impellers 21, 21' having a different number of blades.)

In FIG. 1, the first processor 12 is configured to receive at least one impeller blade of the functionalized polymer coated impeller 20 (FIG. 1a), 20' (FIG. 1b). In FIG. 1b, the at least one impeller blade is shown as impeller blade 20g' being received in an attachment zone 30 that forms part of the attachment rich environment 16 defined by walls 30a, 30b. The first processor 12 may also be configured with a first transition zone generally indicated as 40 to provide drainage from piping 41 of, e.g., tailings 42 as shown in FIG. 1a.

The first processor 12 may also be configured to provide at least one enriched impeller blade having the valuable material attached thereto, after passing through the attachment rich environment 16. In FIG. 1b, the at least one enriched impeller blade is shown as the at least one enriched impeller blade 20c' being provisioned from the attachment rich environment 16 in the first processor 12 to the release rich environment 18 in the second processor 14.

The second processor 14 may be configured to receive via the piping 15 the fluid 22 (e.g. water) and the enriched functionalized polymer coated member to release the valuable material in the release rich environment 18. In FIG. 1b, the second processor 14 is shown receiving the enriched impeller blade 20c' in a release zone 50, e.g., that forms part of the release rich environment 18 and is defined, e.g., by walls 30c and 30d.

The second processor 14 may also be configured to provide the valuable material that is released from the enriched functionalized polymer coated member into the release rich environment 18. For example, in FIG. 1b the second processor 14 is shown configured with a second transition zone 60 defined by walls 30a and 30d to provide via piping 61 drainage of the valuable material in the form of a concentrate 62 (FIG. 1a).

Figure 2:
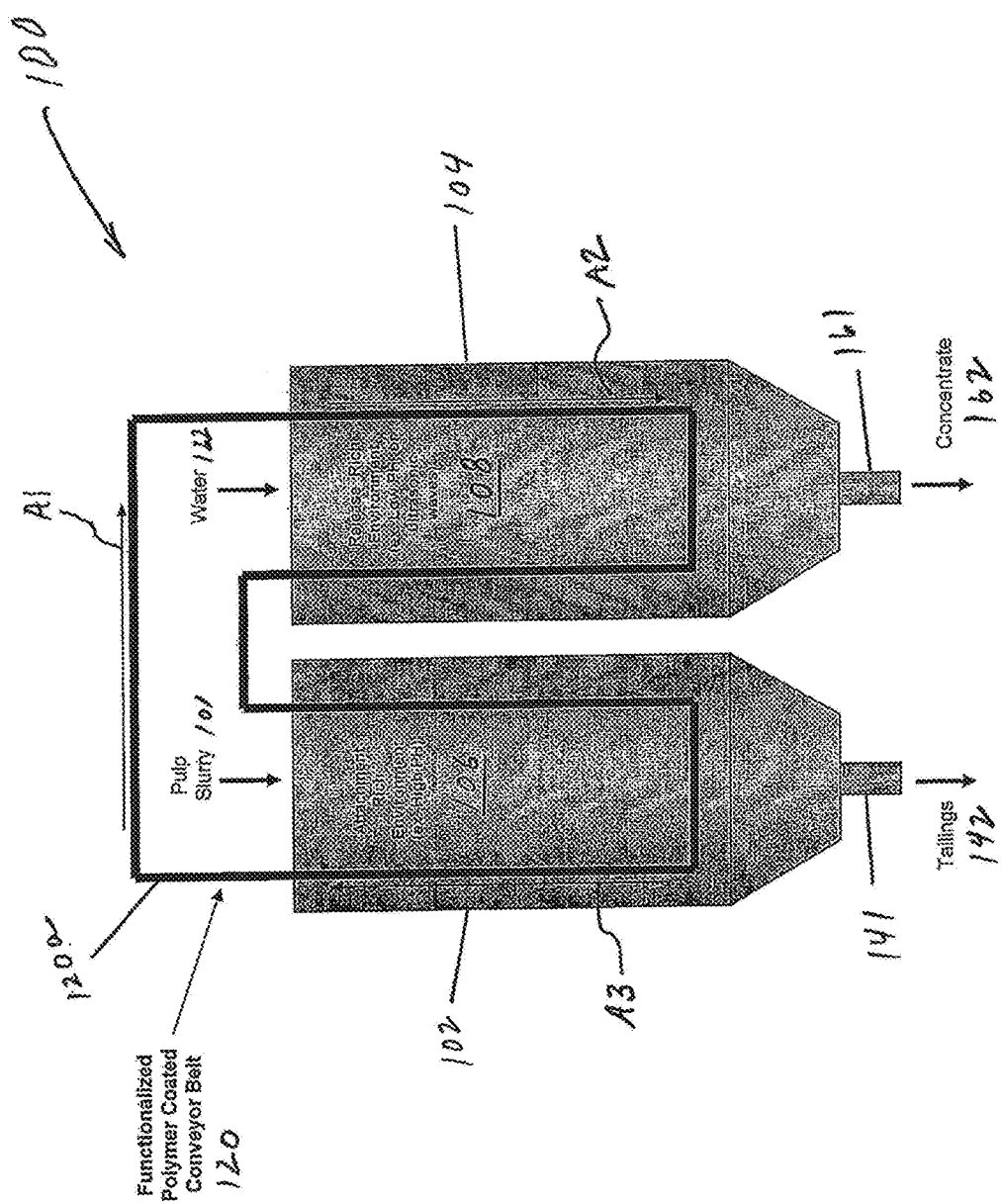
FIG. 2 is diagram of a separation processor configured with two chambers, tanks or columns having a functionalized polymer coated conveyor belt arranged therein according to some embodiments of the present invention.

FIG. 2: The Functionalized Polymer Coated Conveyor Belt

By way of example, FIG. 2 shows the present invention is the form of a machine, device, system or apparatus 100, e.g., for separating valuable material from unwanted material in a mixture 101, such as a pulp slurry, using a first processor 102 and a second processor 104. The first processor 102 and the second processor 104 are configured with a functionalized polymer coated member that is shown, e.g., as a functionalized polymer coated conveyor belt 120 that runs between the first processor 102 and the second processor 104, according to some embodiments of the present invention. The arrows A1, A2, A3 indicate the movement of the functionalized polymer coated conveyor belt 120. Techniques, including motors, gearing, etc., for running a conveyor belt like element 120 between two processors like elements 102 and 104 are known in the art, and the scope of the invention is not intended to be limited to any particular type or kind thereof either now know or later developed in the future. According to some embodiments of the present invention, the functionalized polymer coated conveyor belt 120 may be made of a mesh material.

The first processor 102 may take the form of a first chamber, tank, cell or column that contains an attachment rich environment generally indicated as 106. The first chamber, tank or column 102 may be configured to receive the mixture or pulp slurry 101 in the form of fluid (e.g., water), the valuable material and the unwanted material in the attachment rich environment 106, e.g., which has a high pH, conducive to attachment of the valuable material. The second processor 104 may take the form of a second chamber, tank, cell or column that contains a release rich environment generally indicated as 108. The second chamber, tank, cell or column 104 may be configured to receive, e.g., water 122 in the release rich environment 108, e.g., which may have a low pH or receive ultrasonic waves conducive to release of the valuable material. Consistent with that stated above, attachment rich environments like that forming part of element environment 106 conducive to the attachment of a valuable material of interest and release rich environments like that forming part of environment 108 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 106 and a corresponding release rich environment like environment 108 based on the separation technology disclosed herein for any particular valuable mineral of interest, e.g., copper, forming part of any particular mixture or slurry pulp.

In operation, the first processor 102 may be configured to receive the mixture or pulp slurry 101 of water, valuable material and unwanted material and the functionalized polymer coated conveyor belt 120 that is configured to attach to the valuable material in the attachment rich environment 106. In FIG. 2, the belt 120 is understood to be configured and functionalized with a polymer coating to attach to the valuable material in the attachment rich environment 106.

The first processor 102 may also be configured to provide drainage from piping 141 of, e.g., tailings 142 as shown in FIG. 2.

The first processor 102 may also be configured to provide an enriched functionalized polymer coated conveyor belt having the valuable material attached thereto, after passing through the attachment rich environment 106. In FIG. 2, the enriched functionalized polymer coated conveyor belt is shown, e.g., as that portion or part 120a of the belt 120 being provisioned from the attachment rich environment 106 in the first processor 102 to the release rich environment 108 in the second processor 104. It is understood that some other portions or parts of the belt 120 may be enriched, including the portion or part immediately leaving the attachment rich environment 106, as well as the portion or part immediately entering the release rich environment 108.

The second processor 14 may be configured to receive the fluid 122 (e.g. water) and the portion 120a of the enriched functionalized polymer coated conveyor belt 120 to release the valuable material in the release rich environment 108.

The second processor 104 may also be configured to provide the valuable material that is released from the enriched functionalized polymer coated member into the release rich environment 108. For example, in FIG. 2 the second processor 104 is shown configured to provide via piping 161 drainage of the valuable material in the form of a concentrate 162.

In FIG. 2, the first processor 102 is configured with the functionalized polymer coated conveyor belt 120 passing through with only two turns inside the attachment rich environment 106. However, embodiments are envisioned in which the first processor 102 may be configured to process the functionalized polymer coated conveyor belt 120 using a serpentine technique for winding or turning the belt 120 one way and another way, back and forth, inside the first processor to maximize surface area of the belt inside the processor 102 and exposure of the belt 120 to the attachment rich environment 106.

Figure 3:
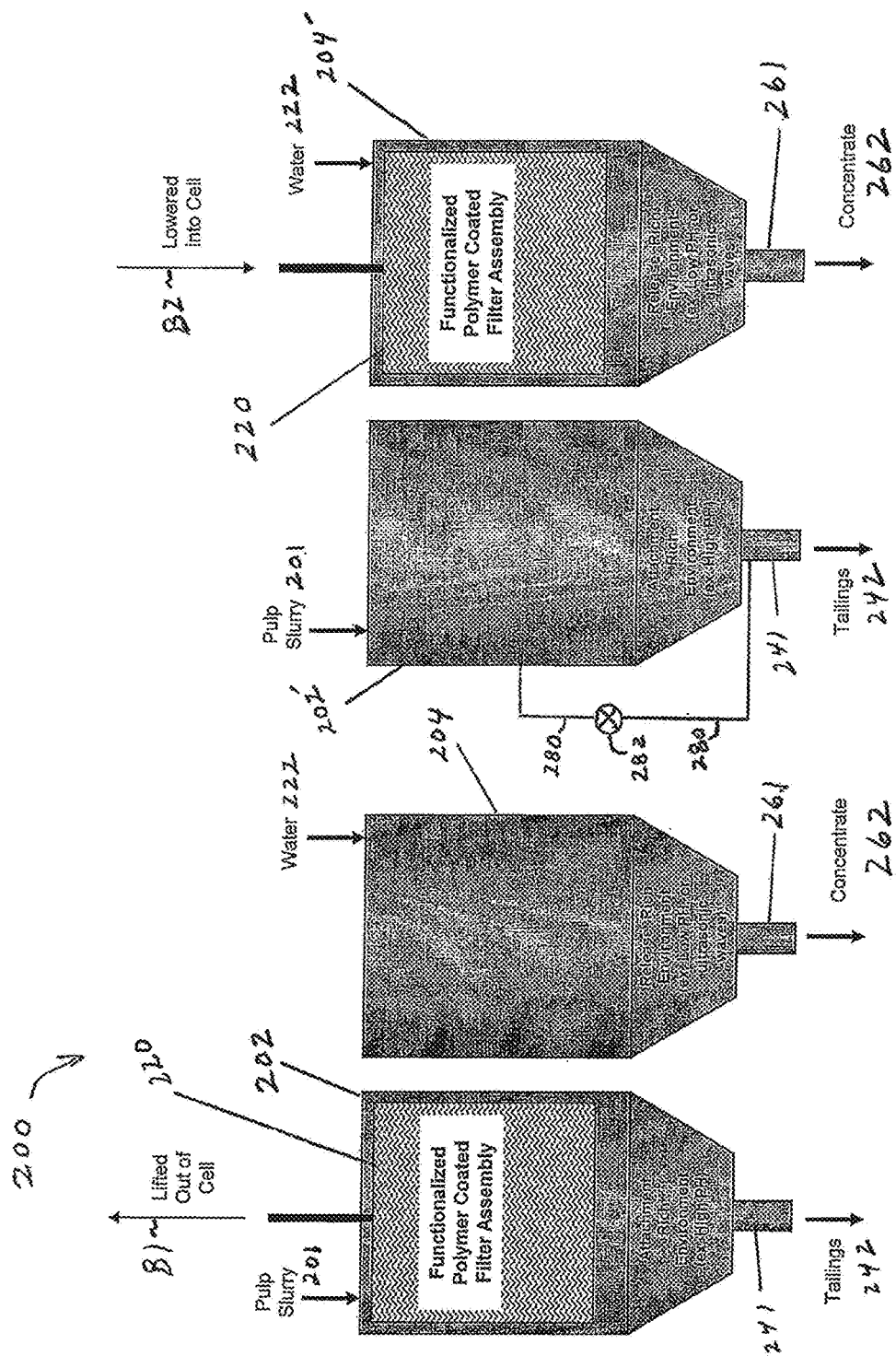
FIG. 3 is diagram of a separation processor configured with a functionalized polymer coated filter assembly for moving between two chambers, tanks or columns in a semi-continuous batch process according to some embodiments of the present invention.

FIG. 3: The Functionalized Polymer Coated Filter

By way of example, FIG. 3 shows the present invention is the form of a machine, device, system or apparatus 200, e.g., for separating valuable material from unwanted material in a mixture 201, such as a pulp slurry, using a first processor 202, 202' and a second processor 204, 204'. The first processor 202 and the second processor 204 are configured to process a functionalized polymer coated member that is shown, e.g., as a functionalized polymer coated collection filter 220 configured to be moved between the first processor 202 and the second processor 204' as shown in FIG. 3 as part of a batch type process, according to some embodiments of the present invention. In FIG. 3, by way of example the batch type process is shown as having two first processor 202, 202' and second processor 204, 204, although the scope of the invention is not intended to be limited to the number of first or second processors. Moreover, embodiments are envisioned using a different number of first and second processor, different types or kinds of processors, as well as different types or kinds of processors both now known or later developed in the future. According to some embodiments of the present invention, the functionalized polymer coated collection filter 220 may take the form of a membrane or a thin soft pliable sheet or layer. The arrow B1 indicates the movement of the functionalized polymer coated filter 220 from the first processor 202, and the arrow B2 indicates the movement of the functionalized polymer coated collection filter 220 into the second processor 202. Techniques, including motors, gearing, etc., for moving a filter like element 220 from one processor to another processor like elements 202 and 204 are known in the art, and the scope of the invention is not intended to be limited to any particular type or kind thereof either now know or later developed in the future.

The first processor 202 may take the form of a first chamber, tank, cell or column that contains an attachment rich environment generally indicated as 206. The first chamber, tank or column 102 may be configured to receive the mixture or pulp slurry 201 in the form of fluid (e.g., water), the valuable material and the unwanted material in the attachment rich environment 206, e.g., which has a high pH, conducive to attachment of the valuable material. The second processor 204 may take the form of a second chamber, tank, cell or column that contains a release rich environment generally indicated as 208. The second chamber, tank, cell or column 204 may be configured to receive, e.g., water 222 in the release rich environment 208, e.g., which may have a low pH or receive ultrasonic waves conducive to release of the valuable material. Consistent with that stated above, attachment rich environments like that forming part of element environment 206 conducive to the attachment of a valuable material of interest and release rich environments like that forming part of environment 208 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 206 and a corresponding release rich environment like environment 208 based on the separation technology disclosed herein for any particular valuable mineral of interest, e.g., copper, forming part of any particular mixture or slurry pulp.

In operation, the first processor 202 may be configured to receive the mixture or pulp slurry 101 of water, valuable material and unwanted material and the functionalized polymer coated collection filter 220 that is configured to attach to the valuable material in the attachment rich environment 206. In FIG. 3, the functionalized polymer coated collection filter 220 is understood to be configured and functionalized with a polymer coating to attach to the valuable material in the attachment rich environment 106.

The first processor 202 may also be configured to provide drainage from piping 241 of, e.g., tailings 242 as shown in FIG. 3.

The first processor 202 may also be configured to provide an enriched functionalized polymer coated collection filter having the valuable material attached thereto, after soaking in the attachment rich environment 106. In FIG. 3, the enriched functionalized polymer coated collection filter 220 is shown, e.g., being provisioned from the attachment rich environment 206 in the first processor 202 to the release rich environment 208 in the second processor 204.

The second processor 204 may be configured to receive the fluid 222 (e.g. water) and the enriched functionalized polymer coated collection filter 220 to release the valuable material in the release rich environment 208.

The second processor 204 may also be configured to provide the valuable material that is released from the enriched functionalized polymer coated collection filter 220 into the release rich environment 208. For example, in FIG. 3 the second processor 204 is shown configured to provide via piping 261 drainage of the valuable material in the form of a concentrate 262.

The first processor 202' may also be configured with piping 280 and pumping 280 to recirculate the tailings 242 back into the first processor 202'. The scope of the invention is also intended to include the second processor 204' being configured with corresponding piping and pumping to recirculate the concentrate 262 back into the second processor 204'. Similar recirculation techniques may be implemented for the embodiments disclosed in relation to FIGS. 1-2 above.

The scope of the invention is not intended to be limited to the type or kind of batch process being implemented. For example, embodiments are envisioned in which the batch process may include the first and second processors 202, 204 being configured to process the enriched functionalized polymer coated collection filter 220 in relation to one type or kind of valuable material, and the first and second processors 202', 204' being configured to process the enriched functionalized polymer coated collection filter 220 in relation to either the same type or kind of valuable material, or a different type or kind of valuable material. Moreover, the scope of the invention is intended to include batch processes both now known and later developed in the future.

In order to further clarify the term "functionalized polymer" as applied to the coated impeller 20 (FIG. 1a), the coated conveyor belt 120 (FIG. 2) and the collection filter 220 (FIG. 3), various surfaces to be coated are illustrated in FIGS. 4-6. The various physical structures of the surfaces to be coated are illustrated in FIGS. 7a-7f, and some embodiments of the functionalized polymer are depicted in FIGS. 8a, 8b, 8c, 9a, 9b and 9c.

By way of example, the polymer, according to some embodiments of the present invention, at least can be functionalized to attract particles in two different ways.
1. The polymer surface has a plurality of molecules 73 (FIGS. 8a, 9a) having a functional group 78 (FIGS. 8a, 8b) to attract mineral particles 72 (FIGS. 8a, 9a).
2. The polymer surface has a plurality of molecules 79 (FIGS. 8b, 9b, 9c, 9d) rendering the surface hydrophobic in order to attract mineral particles 71, 71' (FIGS. 8b, 9b, 9c, 9d). Molecules 79 represent siloxane functional groups. The siloxane functional groups may be provided by one or more of dimethyl siloxane, dimethylvinyl-terminated; polydimethylsiloxane; and dimethyl, methylhydrogen siloxane. The siloxane functional groups may be provided by dimethyl siloxane, hydrogen-terminated.

Polymer Surface Having Functional Groups

Figure 8C:
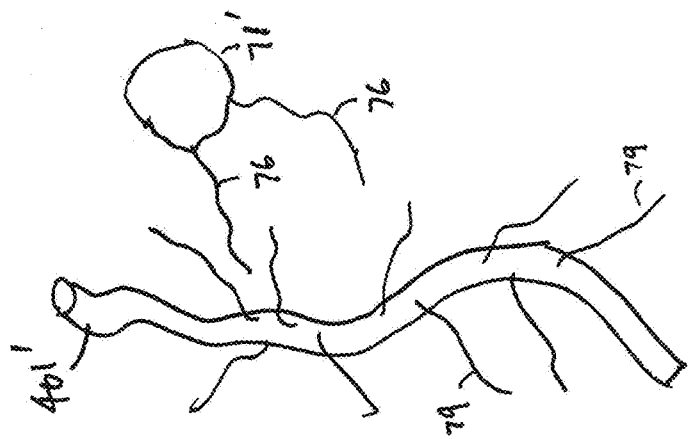
FIG. 8c illustrates a plurality of hydrophobic molecules attached to a fiber for attracting non-mineral particles according to some embodiments of the present invention.

The term "polymer" in this disclosure means a large molecule made of many units of the same or similar structure linked together. In some embodiments of the present invention, the polymer surface on a filter has a plurality of molecules 73 (FIGS. 8a, 9a) having a functional group 78 (FIGS. 8a, 8b) to attract mineral particles 72 (FIGS. 8a, 9a). In these embodiments, the unit can be a monomer or an oligomer which forms the basis of, for example, polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, polydimethylsiloxane and other organic or inorganic polymers. Thus, the synthetic material can be hard or rigid like plastic or soft and flexible like an elastomer. While the physical properties of the filter can vary, the surface of the filter is chemically functionalized to provide a plurality of functional groups to attract mineral particles. The terms "valuable material" and "mineral particle" are used herein interchangeably. It is possible to use a molecule or molecular segment 76 (FIG. 8a, 9a) to attach a functional group 78 to the polymer surface. In general, the molecule 76 can be a hydrocarbon chain, for example, and the functional group 78 can be ionic for attracting a mineral, such as copper to the surface 74. A xanthate, for example, has both the functional group 78 and the molecular segment 76 to be incorporated into the polymer that is used to make or coat the surface. A functional group 78 is also known as a collector that is either ionic or non-ionic. The ion can be anionic or cationic. An anion includes, but not limited to, oxyhydryl, such as carboxylic, sulfates and sulfonates, and sulfhydral, such as xanthates and dithiophosphates. Other molecules or compounds that can be used to provide the function group 78 include thionocarboamates, thioureas, xanthogens, monothiophosphates, hydroquinones and polyamines. Similarly, a chelating agent can be incorporated into the polymer as a collector site for attaching to a mineral, such as copper. A surface having a functionalized polymer is also referred herein as synthetic surface.

Polymer Having Molecules to Render a Surface Hydrophobic

In some embodiments of the present invention, at least the surface of a filter surface is functionalized so that the surface is hydrophobic. It is possible to functionalize a polymer surface to have a plurality of molecules 79 (FIGS. 8b, 8c, 9b, 9c) to render the surface hydrophobic. The molecules 79 may comprise a siloxane functional group.

In chemistry, hydrophobicity is the physical property of a molecule (known as a hydrophobe) that is repelled from a mass of water. Hydrophobic molecules tend to be non-polar and, thus, prefer other neutral molecules and non-polar solvents. Hydrophobic molecules in water often cluster together. According to thermodynamics, matter seeks to be in a low-energy state, and bonding reduces chemical energy. Water is electrically polarized, and is able to form hydrogen bonds internally, which gives it many of its unique physical properties. But, since hydrophobes are not electrically polarized, and because they are unable to form hydrogen bonds, water repels hydrophobes, in favor of bonding with itself. It is this effect that causes the hydrophobic interaction.

The hydrophobic effect is the observed tendency of nonpolar substances to aggregate in aqueous solution and exclude water molecules. It can be observed as the segregation and apparent repulsion between water and non-polar substances. The hydrophobic interaction is mostly an entropic effect originating from the disruption of hydrogen bonds between molecules of liquid water by the non-polar solute. A hydrocarbon chain or a similar non-polar region or a big molecule is incapable of forming hydrogen bonds with water. The introduction of such a non-hydrogen bonding surface into water causes disruption of the hydrogen bonding network between water molecules. By aggregating together, nonpolar molecules reduce the surface area exposed to water and minimize their disruptive effect.

Froth flotation is a process for selectively separating hydrophobic materials from hydrophilic. The process has been adapted and applied to a wide variety of materials to be separated, and additional collector agents, including surfactants and synthetic compounds have been adopted for various applications.

In mining operations, froth flotation is a process for separating minerals from gangue by taking advantage of differences in their hydrophobicity. Hydrophobicity differences between valuable minerals and waste gangue are increased through the use of surfactants and wetting agents. The selective separation of the minerals makes processing complex (that is, mixed) ores economically feasible. The flotation process is used for the separation of a large range of sulfides, carbonates and oxides prior to further refinement. Phosphates and coal are also upgraded (purified) by flotation technology. Froth flotation commences by comminution (that is, crushing and grinding), which is used to increase the surface area of the ore for subsequent processing. The ore include the desired minerals and other unwanted materials, know a gangue. The process of grinding the ore into a fine power is known as liberation. The fine powder ore is then mixed with water to form a slurry. The desired mineral is rendered hydrophobic by the addition of a surfactant or collector chemical. The particular chemical depends on which mineral is being refined. This slurry (more properly called the pulp) of hydrophobic mineral particles and hydrophilic gangue particles is then placed in a flotation column or horizontal pipeline wherein the concentrated mineral is separated from the tailings containing the gangue. To be effective on a given ore slurry, the collectors are chosen based upon their selective wetting of the types of particles to be separated. A good collector will adsorb, physically or chemically, with one of the types of particles. In a flotation circuit for mineral concentration, various flotation reagents are added to a mixture of ore and water (called pulp) in a conditioning tank. The flow rate and tank size are designed to give the minerals enough time to be activated. The conditioner pulp is fed to a bank of rougher cells which remove most of the desired minerals as a concentrate. The rougher pulp passes to a bank of scavenger cells where additional reagents may be added. The scavenger cell froth is usually returned to the rougher cells for additional treatment, but in some cases may be sent to special cleaner cells. The scavenger pulp is usually barren enough to be discarded as tails. More complex flotation circuits have several sets of cleaner and re-cleaner cells, and intermediate re-grinding of pulp or concentrate. Because of a number of other factors, as much as 15% of the liberated minerals are not recovered and are discarded as gangue.

Collectors

Collectors either chemically bond (chemisorption) on a hydrophobic mineral surface, or adsorb onto the surface in the case of, for example, coal flotation through physisorption. Collectors increase the natural hydrophobicity of the surface, increasing the separability of the hydrophobic and hydrophilic particles. The hydrophobic particles of interest, according to the present invention, are depicted as particles 71', 72' in FIGS. 8*b*, 8*c*, 9*b* and 9*c*.

FIGS. 4, 5 and 6: Impellers, Conveyor Belts and Filters

By way of example, the impeller 20 (FIG. 1) has a collection area 23 to support the functionalized polymer (FIG. 4). The conveyor belt 120 (FIG. 2) has a collection area 123 to support the functionalized polymer (FIG. 5). The filter 220 (FIG. 3) has a collection area 223 to support the functional polymer (FIG. 6). The collection area 23, 123 and 223 can take many forms and have various surface features (FIGS. 7*a*-7*f*) to attract the mineral particles of interest, when the impeller 20, conveyor belt 120 and the filter 220 are made contact with a mixture or pulp slurry 11 (FIG. 1), 101 (FIG. 2), 201 (FIG. 3) that includes water and valuable material.

FIGS. 7*a*-7*f*: Surface Features

Figure 7A:
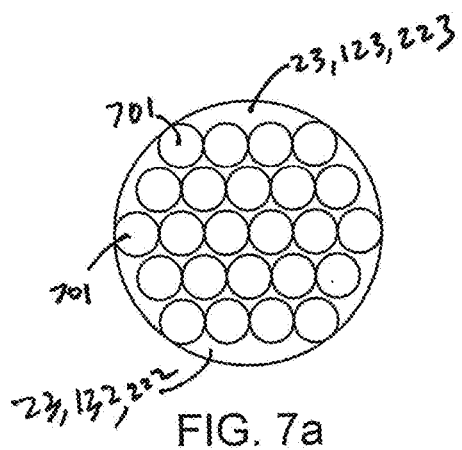
FIGS. 7a-7f illustrates various surface features of the impeller, conveyor belt and filter according to some embodiments of the present invention.
Figure 7B:
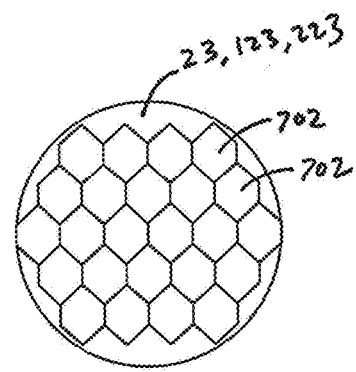
Figure 7C:
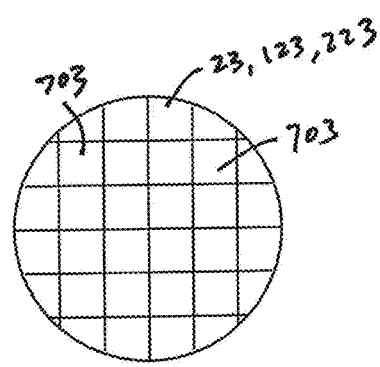
Figure 7D:
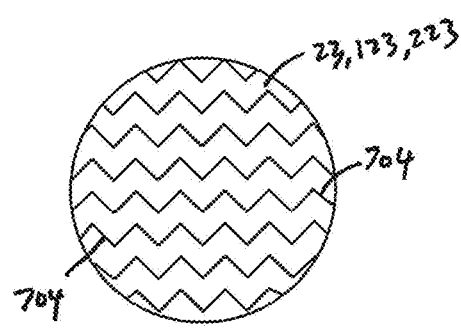
Figure 7E:
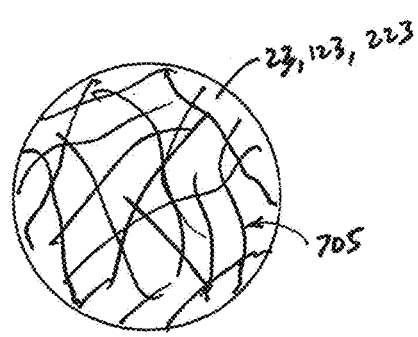
Figure 7F:
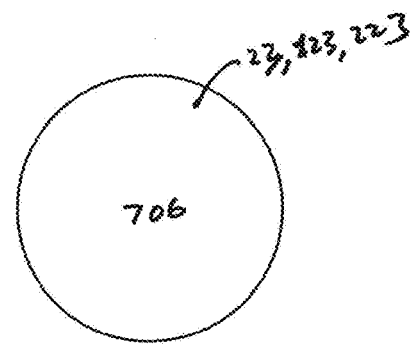
Figure 12C:
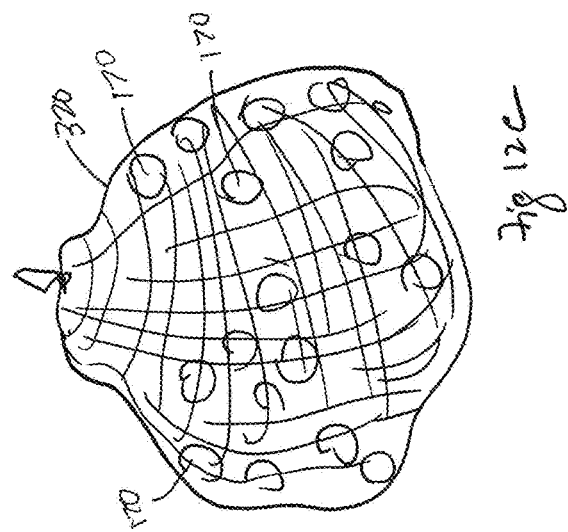
FIG. 12c illustrates a sack of synthetic beads which can be used as a filter to collect valuable material in a tailings pond, for example, according to some embodiments of the present invention.
Figure 12B:
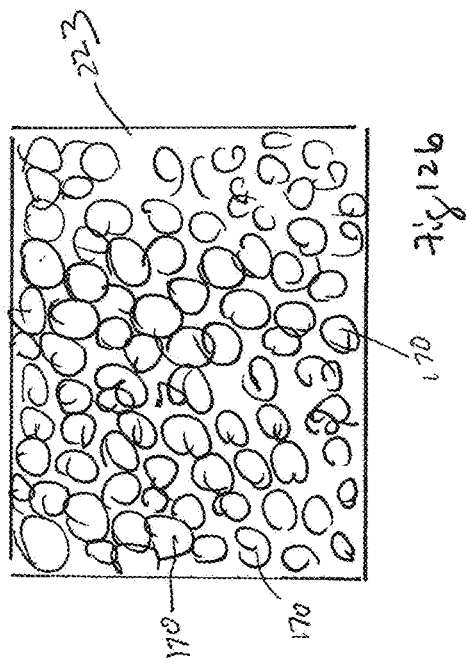
FIG. 12b illustrates a filter using a plurality of synthetic beads or bubbles for collecting valuable material, according to some embodiments of the present invention.
Figure 12A:
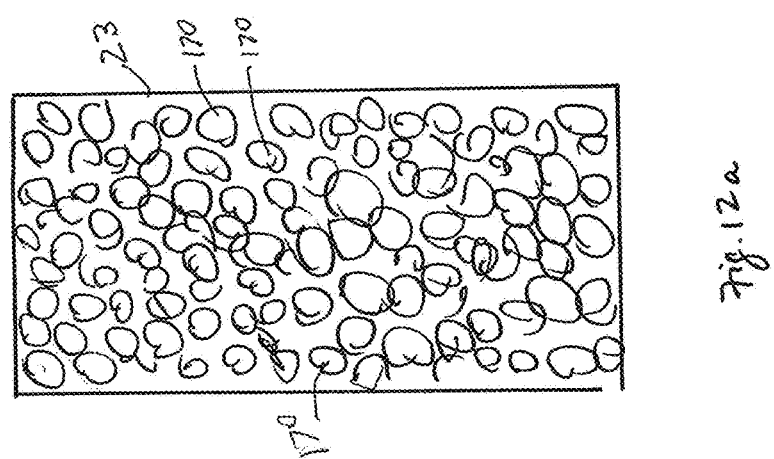
FIG. 12a illustrates an impeller using a plurality of synthetic beads or bubbles for collecting valuable material, according to some embodiments of the present invention.

By way of example, each of the collection areas 23, 123 and 223 (FIGS. 4-6) may have a plurality of openings to allow the pulp slurry 11 (FIG. 1), 101 (FIG. 2), 201 (FIG. 3) to pass through while collecting at least part of the valuable material in the pulp slurry. The surface inside an opening and the surfaces or edges around the opening will be provided with the functional groups to attract the mineral particles. Those surfaces are referred to as collection surfaces. For example, the openings on the collection areas 23, 123 and 223 can take the form of holes or cylindrical passage ways 701 as shown in FIG. 7*a*. The openings on the collection areas 23, 123 and 223 can take the form of hexagonal passage ways 702 arranged like honeycomb, as shown in FIG. 7*b*. The collection areas 23, 123 and 223 can have a rectangular grid 703, as shown in FIG. 7*c*. The collection areas 23, 123 and 223 may comprise a stack of wavy sheets 704 *a* shown in FIG. 7*d*. The collection areas 23, 123 and 223 may comprise an irregular arrangement of fiber-like structures 705 as shown in FIG. 7*e*. The collection areas 23, 123 and 223 may comprise a plain surface 706 as shown in FIG. 7*f*. The plain surface 06 may be a smooth surface, a paper-like surface or matted surface, without larger structures. The collection area 23, 123 and 223 can be made of a synthetic material, such as a polymer functionalized for attracting the mineral particles. Alternatively, only the collection surfaces are coated with such a polymer. In a different embodiment of the present invention, the collection area 223 comprises a panel, such as a glass panel, a ceramic panel and a metal sheet, wherein one or both sides of the panel has a plain surface 706. In yet another embodiment of the present invention, the impeller 20 and the filter 220 comprise a collection of synthetic bubbles or beads as shown in FIGS. 12*a*-12*b*.

FIGS. 8*a*-9*c*: Surface Molecules

Figure 8B:
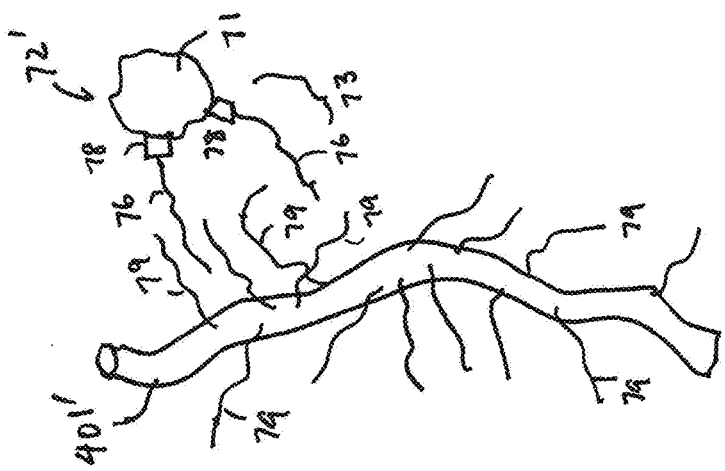
FIG. 8b illustrates a plurality of hydrophobic molecules attached to a fiber for attracting mineral particles, according to some embodiments of the present invention.
Figure 8A:
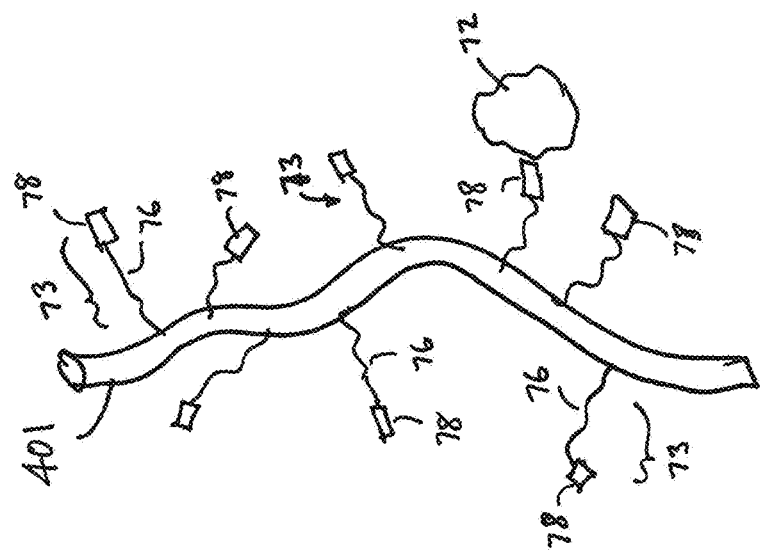
FIG. 8a illustrates a plurality of functional groups attached to a fiber for attracting mineral particles according to some embodiments of the present invention, according to some embodiments of the present invention.

By way of example, the fiber-like structures 705 (FIG. 7*e*) can be functionalized so that they become attached to molecules 73 (FIGS. 8a, 8b). The fiber-like structures 705 as shown in FIG. 7e can be made of individual fibers 401, 401' as shown in FIG. 8a-8c. In one embodiment of the present invention, the fiber 401 (FIG. 8a) can be made of a polymer that has a plurality of molecules 73 to provide the functional group 78 and the attaching molecular segment 76. A xanthate, for example, has both the functional group 78 and the molecular segment 76 to be incorporated into the polymer that is used to make the fiber 401. A functional group 78 is also known as a collector that is ionic or non-ionic to attract mineral particles 72. The ion can be anionic or cationic. An anion includes, but not limited to, oxyhydryl, such as carboxylic, sulfates and sulfonates, and sulfhydral, such as xanthates and dithiophosphates. Other molecules or compounds that can be used to provide the function group 78 include thionocarboamates, thioureas, xanthogens, monothiophosphates, hydroquinones and polyamines. In another embodiment of the present invention, the fiber 401 is coated with polymer that has the molecules 73 to provide the functional group 78 and the attaching molecular segment 76. With such a coating, the fiber 401 can be made of glass, ceramic, metal, nylon, cotton or a different polymer. A diagram of the fiber 401 and the attached molecules 73 is shown in FIG. 8a.

In a different embodiment of the present invention, the fiber 401' (FIG. 8b) can be made of a polymer that has a plurality of molecules 79 to render the fiber 401' (and thus the collection areas 23, 123 and 223 of FIGS. 4, 5, 6) hydrophobic. The polymer can be a hydrophobic material such as polystyrene, poly(d,l-lactide), poly(dimethylsiloxane), polypropylene, polyacrylic, polyethylene, etc. The polymer can also be a hydrophobically-modified polymer, such as hydrophobically-modified ethyl hydroxyethyl cellulose. Alternatively, the fiber 401' can be made of glass, ceramic, metal, nylon, cotton or other fabric materials and coated with hydrophobic molecules, such as a siloxane functional group in a silicone gel. The molecules 79 cause the fiber 401' to become hydrophobic. As such, a hydrophobically-modified mineral particle 72' can be attracted to the hydrophobic fiber 401'. The hydrophobically-modified, or wetted, mineral particle 72' comprises a mineral particle 71 and one or more molecules 73 attached thereon. The molecule 73, or collector, has a functional group 78 attached to the mineral particle 71 and a hydrophobic chain or molecular segment 76. A diagram showing the attraction between the hydrophobic chain or molecular segments 76 and the hydrophobic fiber 401' is shown in FIG. 8b. It should be understood that the particles 72' may be non-mineral and can be some harmful particles in a body of water. Furthermore, the hydrophobic fiber 401' can also be used to attract non-mineral particles. For example, if a non-mineral particle 71' has one or more hydrophobic chains or molecular segments 76, the non-mineral particle 71' is also attracted to the hydrophobic fiber 401'. A diagram showing the attraction between non-mineral particles 71' and the hydrophobic fiber 401' is shown in FIG. 8c. Thus, the hydrophobic fiber 401' can be used in a filter, impeller or conveyor belt (similar to those shown in FIGS. 4-6) for water-pollution control, water purification, etc.

The surfaces and edges around the openings or surface structures 701, 702, 703, 704 (FIGS. 7a-7d) can be functionalized to provide the molecules 73 (FIGS. 9a, 9b). The exposed surfaces and edges around the openings or surface structures 701, 702, 703, 704 are represented by surface portions 403, 403' as shown in FIGS. 9a-9c. The length L of the surface portions 403, 403' can be equal to the thickness of the impeller 20, conveyor belt 120 and filter 220 (FIGS. 4-6). As with the fiber 401 as shown in FIG. 8a, the surface portion 403 can be made of a polymer that has a plurality of molecules 73 to provide the functional group 78 and the attaching molecular segment 76. In a different embodiment, the surface portion 403 is coated with polymer that has the molecules 73 to provide the functional group 78 and the attaching molecular segment 76. The surface portion 403 can be made of glass, ceramic, metal, nylon, cotton or a different polymer. The functional group 78 is used to attract mineral particles 72. A diagram of the surface portion 403 and the attached molecules 73 is shown in FIG. 9a.

In a different embodiment of the present invention, the surface portion 403' can be made of a polymer having a plurality of molecules 79 that render the surface portion 403' (and thus the collection areas 23, 123 and 223 of FIGS. 4, 5, 6) hydrophobic. The molecules 79 may comprise siloxane functional groups. As with the hydrophobic fiber 401' as shown in FIGS. 8b and 8c, the polymer can be a hydrophobic material such as polystyrene, poly(d,l-lactide), poly(dimethylsiloxane), polypropylene, polyacrylic, polyethylene, etc. The polymer can also be a hydrophobically-modified polymer, such as hydrophobically-modified ethyl hydroxyethyl cellulose. Alternatively, the surface portion 403' can be made of glass, ceramic, metal, nylon, cotton or other fabric materials and coated with hydrophobic molecules, such as polysiloxanes, alkylsilane and fluoroalkylsilane. The molecules 79 cause the surface portion 403' to become hydrophobic. As such, a hydrophobically-modified mineral particle 72' is attracted to the hydrophobic surface portion 403'. A diagram showing the attraction between the molecular segments 76 and the hydrophobic surface portion 403' is shown in FIG. 9b. It should be understood that the particles 72' may be non-mineral and can be some harmful particles in a body of water. Furthermore, the hydrophobic surface portion 403' can also be used to attract non-mineral particles. For example, if a non-mineral particle 71' has one or more hydrophobic chains or molecular segments 76, the non-mineral particle 71' is also attracted to the hydrophobic surface portion 403'. A diagram showing the attraction between the non-mineral particles 71' and the hydrophobic surface portion 403' is shown in FIG. 9c. Thus, a filter, impeller or conveyor belt (similar to those shown in FIGS. 4-6) that has hydrophobic surface portions 403' can also be used for water-pollution control, water purification, etc. to rid of hydrophobically-modified particles 72' which may not be a mineral of interest, but some metal harmful to the environment.

The treatment of plain surface 706 (FIG. 7f) can be made similar to the surface portions 403, 403' as shown in FIGS. 9a-9c. That is, the plain surface 706 can be functionalized to provide a functional group 78 as shown in FIG. 9a. The plain surface 706 can also be functionalized to be hydrophobic, as shown in FIGS. 9b and 9c.

It should be understood that, when the collection area 23 of the impeller 20 (FIG. 4), the collection area 123 of the conveyor belt 120 (FIG. 5) and the collection area 223 of the filter 220 (FIG. 6) are functionalized to be hydrophobic, the pulp slurry 11 (FIG. 1a), the pulp slurry 101 (FIG. 2) and the pulp slurry 201 (FIG. 3) must be mixed with collector molecules such as xanthates or polyethylenimine (PEI) so that the mineral particles 71 (FIGS. 8b and 9b) in the slurry may be hydrophobically modified with the collector molecules 73 to become wetted mineral particles 72'.

Figure 10A:
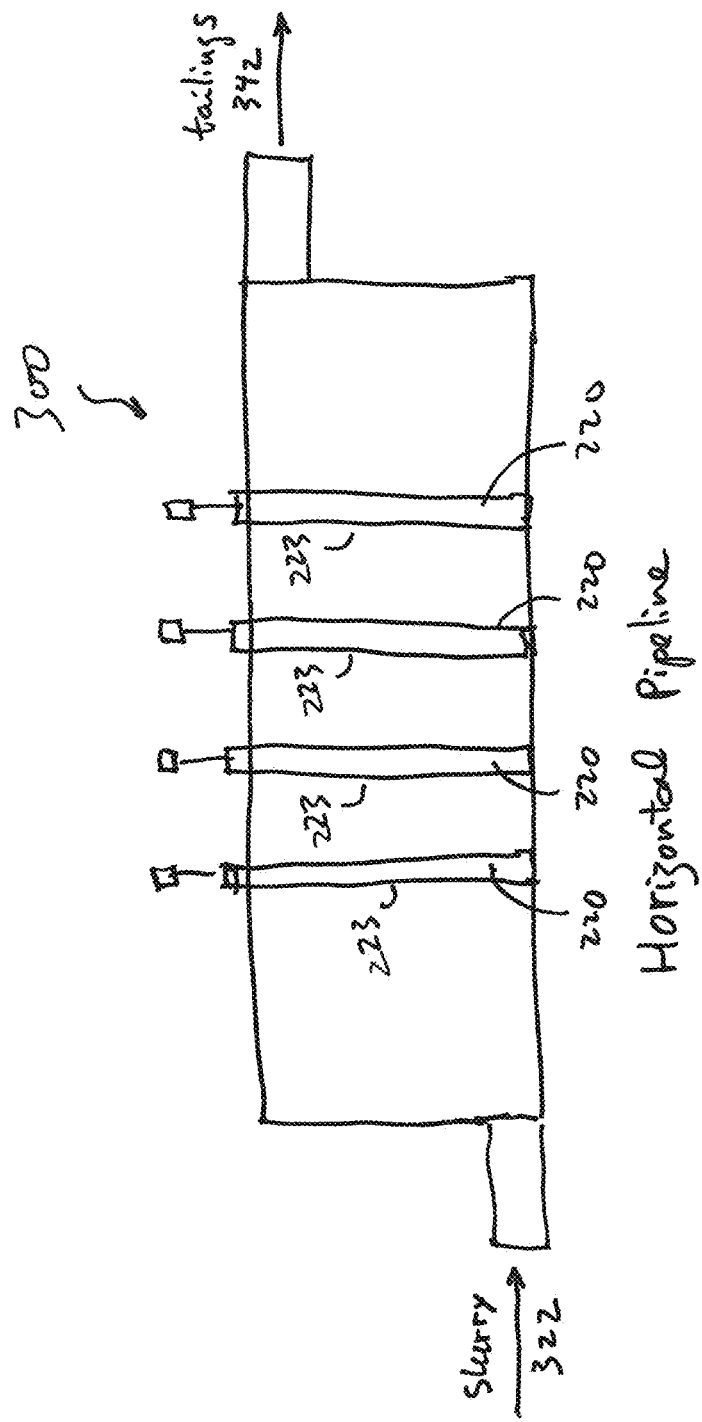
FIG. 10a illustrates a plurality of filters placed in a horizontal pipeline to collect mineral particles, according to some embodiments of the present invention.
Figure 10B:
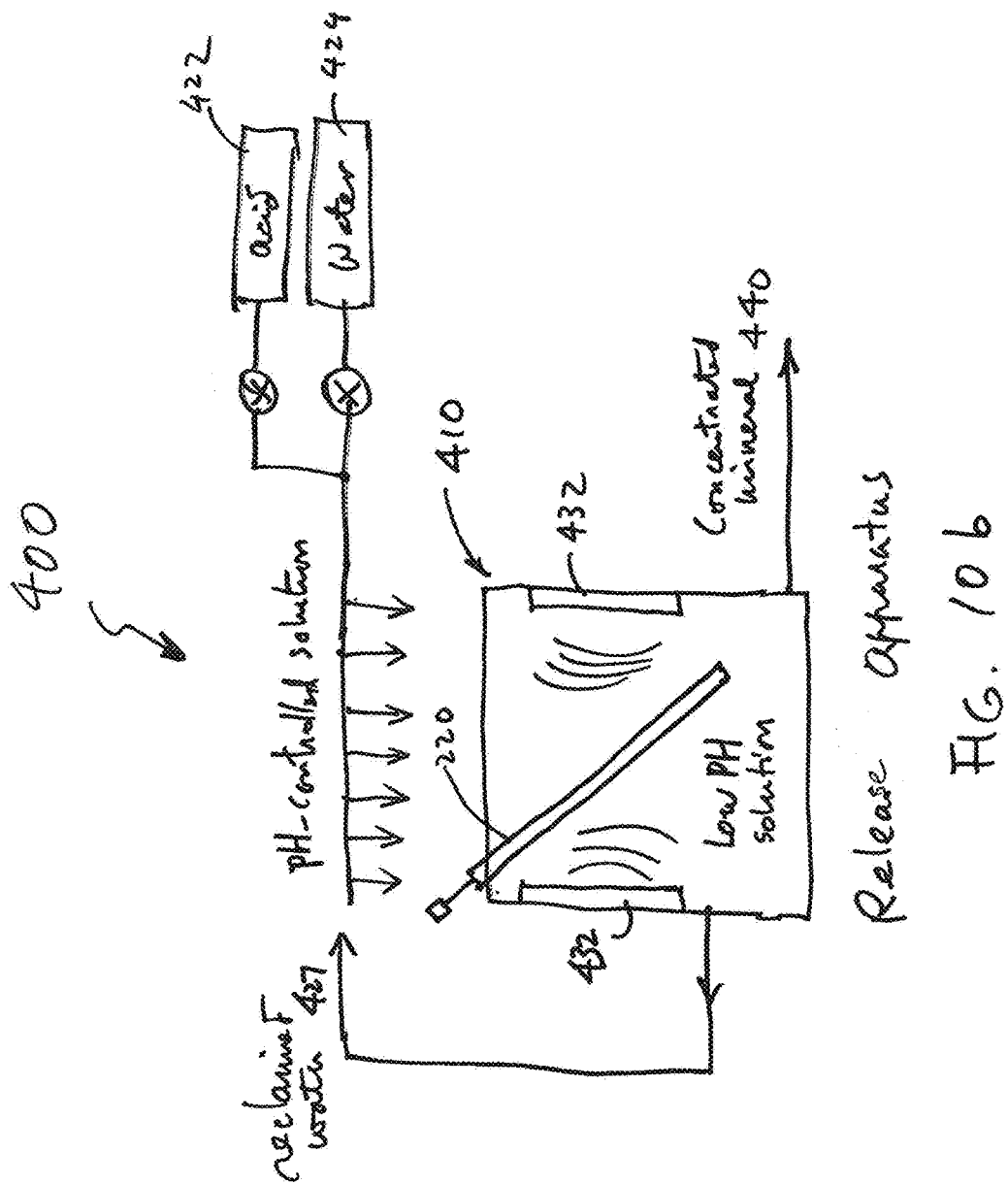
FIG. 10b illustrates a release apparatus configured to release mineral particles from a filter, according to some embodiments of the present invention.
Figure 11:
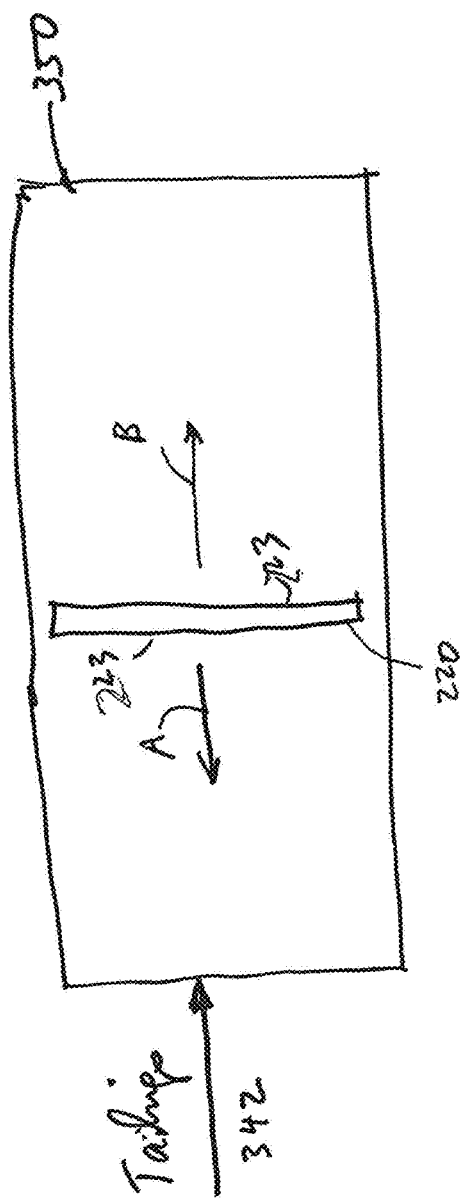
FIG. 11 is a diagram showing a filter placed in a tailings pond to collect valuable material according to some embodiments of the present invention.

In a different embodiment of the present invention, the impeller 20 (FIG. 1a), the conveyor belt 120 (FIG. 2) and the filter 220 (FIG. 3) are used in a horizontal pipeline for mineral separation. Furthermore, a group of filters 220 can be used in a first processor 202 as shown in FIG. 3. By way of example, a plurality of filters 220 are placed into a horizontal pipeline 300 to collect the valuable material in the slurry 322, as shown in FIG. 10a. As the slurry passes through the filters 220, some of the mineral particles in the slurry will become attached to collection area 223 and the openings (see FIGS. 7a-7e). With such an arrangement, one or more of the filters 220 can be taken out of the horizontal pipeline 300 for mineral releasing (see FIG. 10b) while other filters 220 continue to collect the mineral particles. The tailings 342 can be discharged or transported to a tailings pond or the like (see FIG. 11). The attached mineral particles on the filter 220 can be released in a release rich environment with a low pH solution and/or ultrasonic agitation. The pH value of the low pH solution can be 0 to 7, for example. As shown in FIG. 10b, the filter 220 with collected mineral particles can be placed in a releasing apparatus 410 to be washed with a mixture of acid and water provided by water container 424 and acid container 422. One or more ultrasonic sources 432 may be used to shake loose the attached mineral particles from the filter 220. In one embodiment of the present invention, the filter 200 comprises a panel, such as a glass panel, a ceramic panel, a metal sheet, a plastic sheet, wherein the panel is coated with a synthetic material comprising a plurality of molecules configured to attract the mineral particles. The surface of the panel can be a plain surface as shown in FIG. 7f. The reclaimed water 427 can be channeled back for reuse. The concentrated mineral 440 can be taken out of the releasing apparatus 410.

In many releasing environments, the pH value is lower than the pH value for mineral attachment. It should be noted that, however, when the valuable material is copper, for example, it is possible to provide a lower pH environment for the attachment of mineral particles and to provide a higher pH environment for the releasing of the mineral particles from the synthetic beads or bubbles. In general, the pH value is chosen to facilitate the strongest attachment, and a different pH value is chosen to facilitate release. Thus, according to some embodiments of the present invention, one pH value is chosen for mineral attachment, and a different pH value is chosen for mineral releasing. The different pH could be higher or lower, depending on the specific mineral and collector.

Applications

The scope of the invention is described in relation to mineral separation, including the separation of copper from ore.

By way of example, applications are envisioned to include

Rougher/scavenger separation cells in the production stream, replacing the traditional flotation machines.

Tailings scavenger cells are used to scavenge the unrecovered minerals from a tailings stream.

Tailings cleaning cell is used to clean unwanted material from the tailings stream before it is sent to the disposal pond.

Tailings reclamation machine that is placed in the tailings pond to recover valuable mineral that has been sent to the tailings pond.

It should be understood that, the filter 220 (FIGS. 3, 6) can also be used for mineral recovery in a tailings pond or basin. By way of example, one or more filters 220 may be placed in a tailings pond 350 to collect the mineral particles in the tailings 342. In order to increase the contact between the collection area 223 and the tailings 342 in the pond 350, it is possible to move the filters 220 back and forth as indicated by arrows A and B. It is understood that when the collection area 223 of the filter 220 is functionalized to be hydrophobic, collector molecules such as xanthates should be added into the tailings 342 so that the mineral particles in the tailings can be wetted. Alternatively, and by way of further example, PEI may be added into the tailings 342 so that the mineral particles in the tailings can be wetted.

It should be understood that the synthetic beads and filters according to the present invention, whether functionalized to have a collector or functionalized to be hydrophobic, are also configured for use in oilsands separation—to separate bitumen from sand and water in the recovery of bitumen in an oilsands mining operation.

Other types or kinds of valuable material or minerals of interest, include gold, molybdenum, etc.

However, the scope of the invention is intended to include other types or kinds of applications either now known or later developed in the future.

FIGS. 12a-14b: Different Embodiments

On the collection areas 23, 123, 223 of the impeller 20, conveyor belt 120 and filter 220 as shown in FIGS. 4-7f, the collection surfaces on the surface structures are coated with a synthetic material having particular molecules to attract mineral particles. In different embodiments of the present invention, the synthetic material can be used to provide those particular molecules on beads or bubbles, or to make the beads or bubbles (see FIGS. 13a-14b). The bubbles or beads that have the particular molecules to attract mineral particles are herein referred to as synthetic bubbles or beads. By way of example, the synthetic beads or bubbles 170 are used in an impeller or a filter to collect mineral particles 72, 72' (see FIGS. 8a-9b, 13a-14b). As shown in FIG. 12a, the impeller uses a cage or the like to contain a plurality of synthetic beads to provide the collection surfaces in the collection area 23. As shown in FIG. 12b, the filter uses a cage or the like to contain a plurality of synthetic beads 170 to provide the collection surfaces in the collection area 223. When the synthetic beads or bubbles 170 are used to collect valuable material in a tailings pond 350 (FIG. 11), they can be put in a sack 320 as shown in FIG. 12c. As with the synthetic material that is used on the collection surfaces 403, 403' (FIGS. 9a-9c), the synthetic material to be used on the synthetic beads or bubbles 170 may have the functional groups 78 to attract the mineral particles 72, or may have the hydrophobic molecules 79 comprising a siloxane functional group.

Figure 13B:
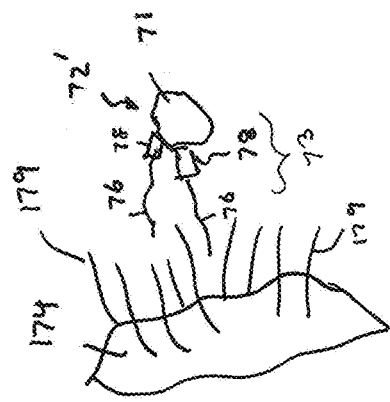
FIG. 13b is an enlarged surface portion of the synthetic bead functionalized to attract wetted mineral particles, according to some embodiments of the present invention.
Figure 13C:
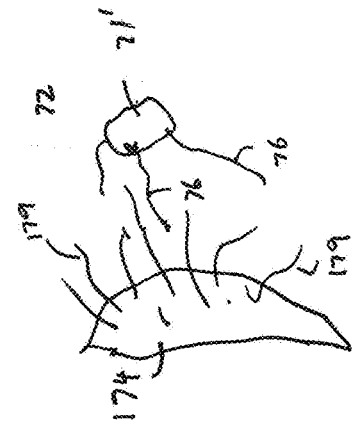
FIG. 13c is an enlarged surface portion of the synthetic bead functionalized to attract non-mineral hydrophobic particles, according to some embodiments of the present invention.
Figure 13A:
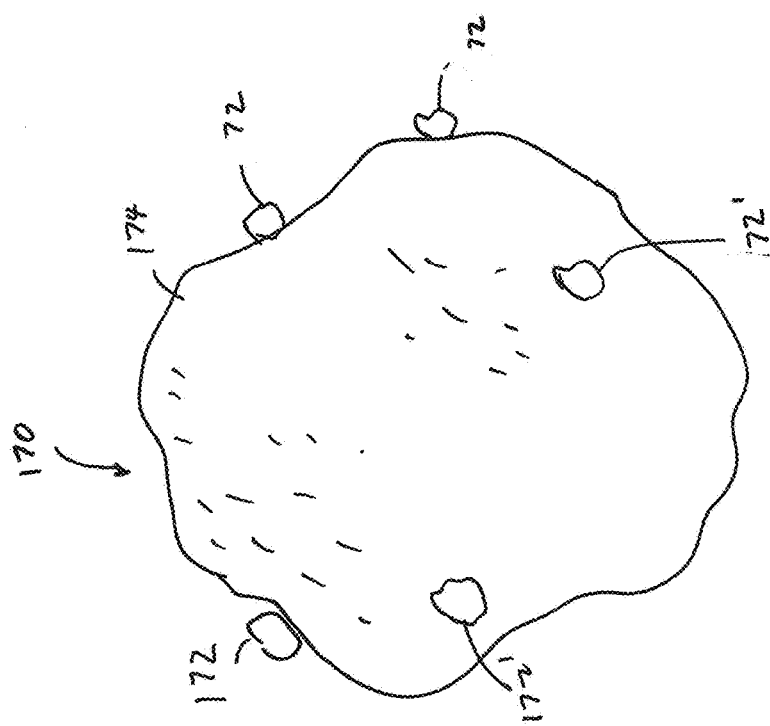
FIG. 13a illustrates a synthetic bead functionalized to attract hydrophobic particles, according to some embodiments of the present invention.

FIG. 13a illustrates a synthetic bead functionalized to attract hydrophobic particles. As shown in FIG. 13a, the synthetic bubble or bead 170 has a solid-phase bead body to provide a bead surface 174. At least the outside part of the bead body is made of a synthetic material, such as a hydrophobic polymer, or a coating of a hydrophobic chemical. As shown in FIGS. 13a and 13b, the surface 174 of the synthetic bubble or bead comprises a plurality of molecules 79 which renders the surface 174 hydrophobic. Molecules 79 may comprise a siloxane functional group. For example, the surface 174 may be a glass surface coated with polysiloxanes which can bind to the hydroxyl group of the glass surface. Polysiloxanes, such as hydroxyl-terminated polydimethysiloxanes, have a silicon-oxygen chain to provide the hydrophobic molecules 79. The hydrophobic particle 72', as shown in FIG. 13b, can be a mineral particle 71 having one or more collectors 73 attached thereto. One end (78) of the collector 73 has an ionizing bond attached to the mineral particle 71. The other end of the collector 73 has a hydrophobic chain 76 which tends to move into the hydrophobic molecules 79. Thus, the hydrophobic particle 72' can be a wetted mineral particle. A collector, such as xanthate, has both the functional group 78 and the molecule 76. The hydrophobic particle 72, as shown in FIG. 13c, can be a particle 71' that has a hydrophobic chain 76. Such particle can be non-mineral related, but it can be arranged to contact with the hydrophobic synthetic bubbles or beads 170 of the present inventions. Likewise, the particle 71 may be non-mineral and can be harmful to the environment. Thus the hydrophobic bubbles or beads 170, according to the present invention, can be used in non-mining applications, such as water-pollution control and water purification. The size of the synthetic bead can be smaller than the minimum size of the mineral particles which is about 150 μm, and can be larger than the maximum size of the mineral particles. In certain applications, the size of the synthetic bead can be 1 cm or larger.

Figure 14B:
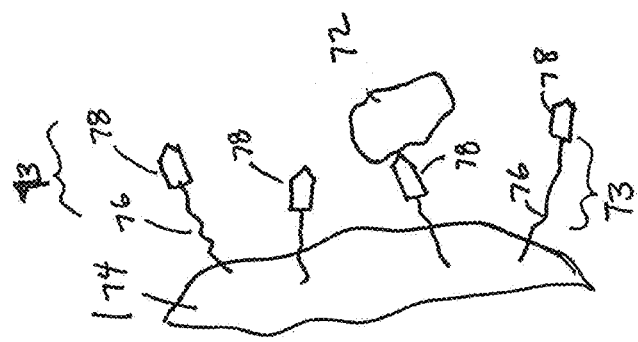
FIG. 14b is an enlarged surface portion of the synthetic bead functionalized to attract mineral particles, according to some embodiments of the present invention.
Figure 14A:
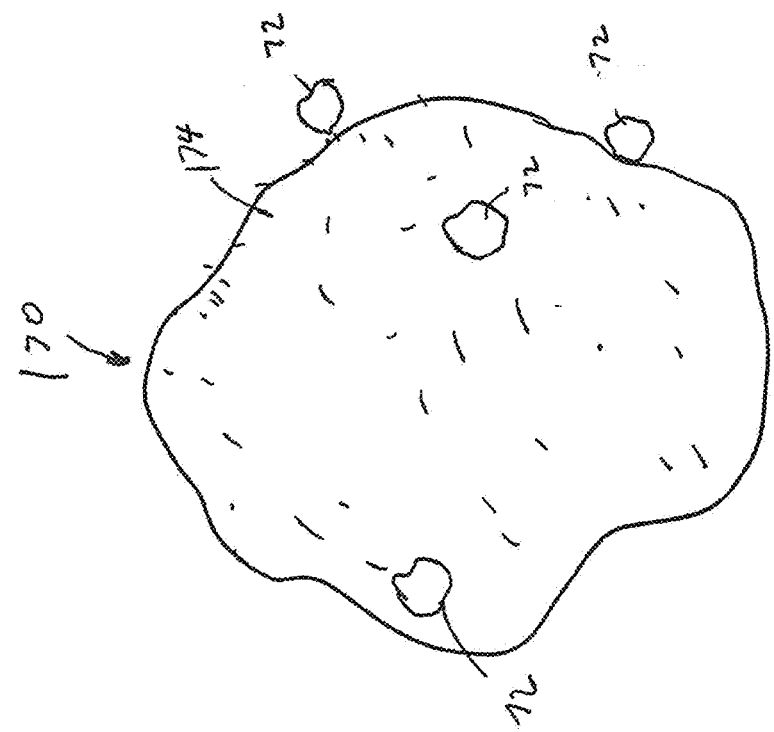
FIG. 14a illustrates a synthetic bead having a functional group to attract mineral particles according to some embodiments of the present invention.

FIG. 14a illustrates a synthetic bead having a functional group to attract mineral particles. The synthetic bead 170 has a bead body to provide a bead surface 174 to attract mineral particles 72. FIG. 14b is an enlarged surface of the synthetic bead functionalized to attract mineral particles. At least the outside part of the bead body is made of a synthetic material, such as polymer, so as to provide a plurality of molecules or molecular segments 76 on the surface 174. The molecule 76 is used to attach a chemical functional group 78 to the surface 174. In general, the molecule 76 can be a hydrocarbon chain, for example, and the functional group 78 can have an anionic bond for attracting a mineral, such as copper to the surface 174. A xanthate, for example, has both the functional group 78 and the molecular segment 76 to be incorporated into the polymer that is used to make the synthetic bead 70. The functional group 78 is also known as a collector that can have a non-ionizing or ionizing bond to attract the mineral particles 72. Similarly, a chelating agent can be incorporated into the polymer as a collector site for attracting a mineral, such as copper.

The releasing of the mineral particles from the synthetic beads can be similar to the releasing of the mineral particles from the impeller, conveyor belt or the filter. For example, after the synthetic beads 170 in the collection area 23 or 223 or in the sack 320 (FIGS. 12a-12c) have collected a certain amount of mineral particles, the synthetic beads 170 can be made contact with a low pH solution and/or subjected to ultrasonic agitation (e.g., FIG. 10b) in order to release the mineral particles. However, a high pH solution can also be used for releasing certain mineral particles while a low pH environment is used for mineral attachment.

According to some embodiments of the present invention, only a portion of the surface of the synthetic bead is functionalized to be hydrophobic. This has the benefits as follows:
 1. Keeps too many beads from clumping together—or limits the clumping of beads,
 2. Once a mineral is attached, the weight of the mineral is likely to force the bead to rotate, allowing the attached mineral particles to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

According to some embodiments of the present invention, only a portion of the surface of the synthetic bead is functionalized with collectors. This also has the benefits of
 1. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

Figure 15A:
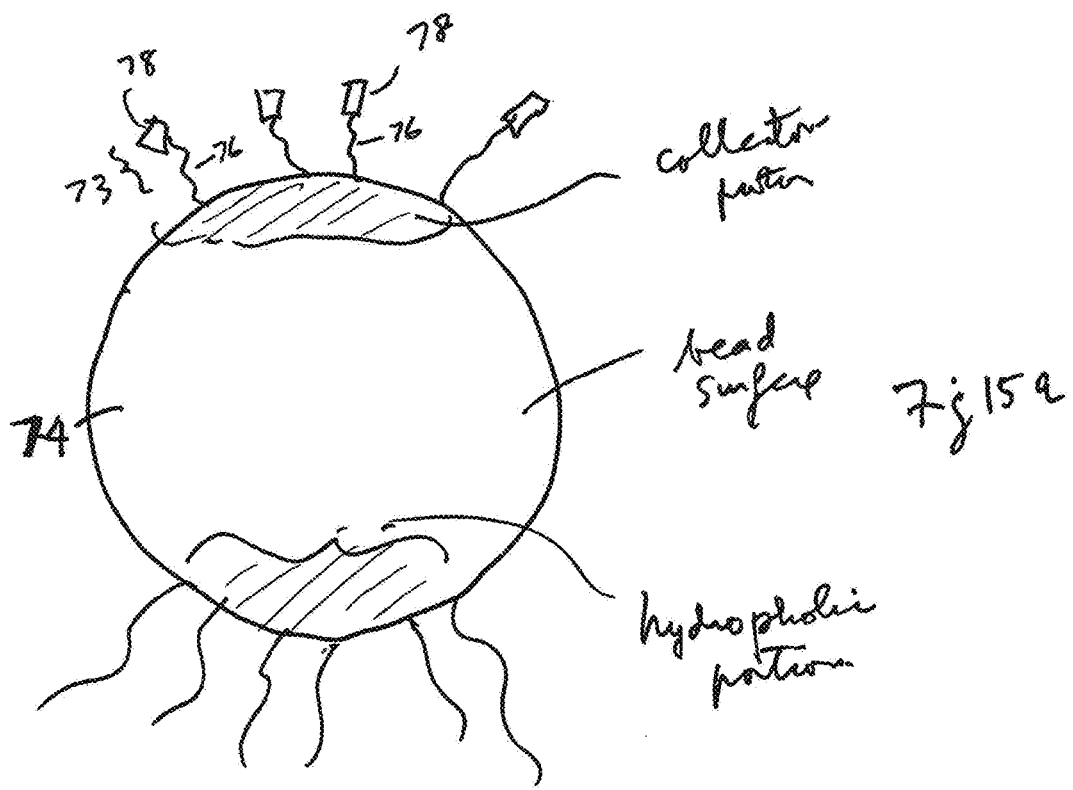
FIGS. 15a and 15b illustrate some embodiments of the present invention wherein the synthetic bead or bubble have one portion functionalized to have collector molecules and another portion functionalized to be hydrophobic, according to some embodiments of the present invention.
Figure 15B:
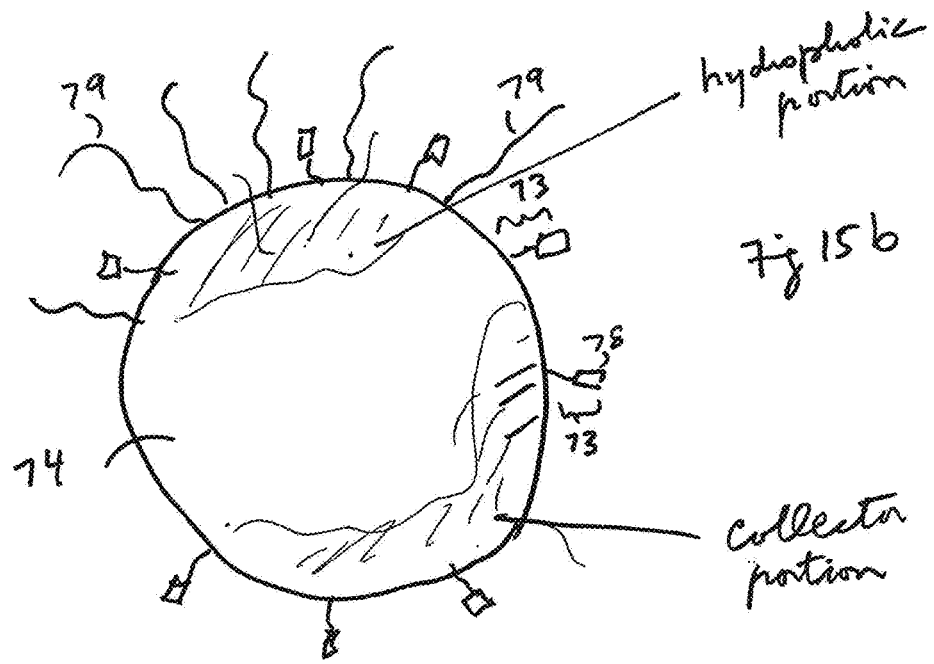

According to some embodiments of the present invention, one part of the synthetic bead is functionalized with collectors while another part of same synthetic bead is functionalized to be hydrophobic as shown in FIGS. 15a and 15b. As shown in FIG. 15a, a synthetic bead 74 has a surface portion where polymer is functionalized to have collector molecules 73 with functional group 78 and molecular segment 76 attached to the surface of the bead 74. The synthetic bead 74 also has a different surface portion where polymer is functionalized to have hydrophobic molecules 79. In the embodiment as shown in FIG. 15b, the entire surface of the synthetic bead 74 can be functionalized to have collector molecules 73, but a portion of the surface is functionalized to have hydrophobic molecules 79 render it hydrophobic. Molecules 79 may comprise a siloxane functional group.

This "hybrid" synthetic bead can collect mineral particles that are wetted and not wetted.

According to some embodiments of the present invention, the surface of a synthetic bead can be functionalized to have a collector molecule. The collector has a functional group with an ion capable of forming a chemical bond with a mineral particle. A mineral particle associated with one or more collector molecules is referred to as a wetted mineral particle. According to some embodiments of the present invention, the synthetic bead can be functionalized to be hydrophobic in order to collect one or more wetted mineral particles.

Figure 16A:
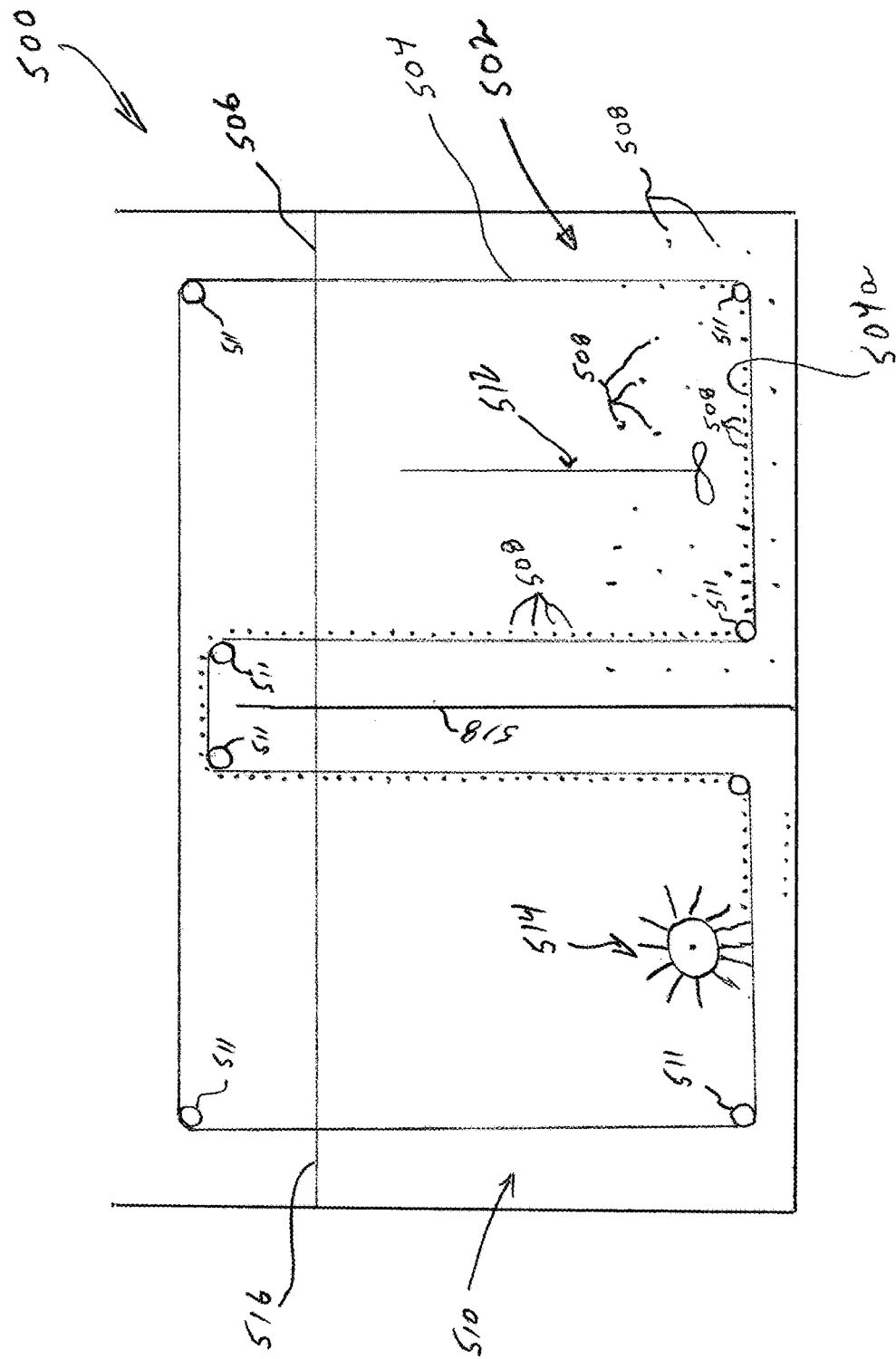
FIG. 16a shows a diagram of apparatus having a conveyor belt made of polyurethane and coated with a silicone gel for collecting value material of a wide range of sizes, including the particles far larger than about 500 microns, according to some embodiments of the present invention.
Figure 16B:
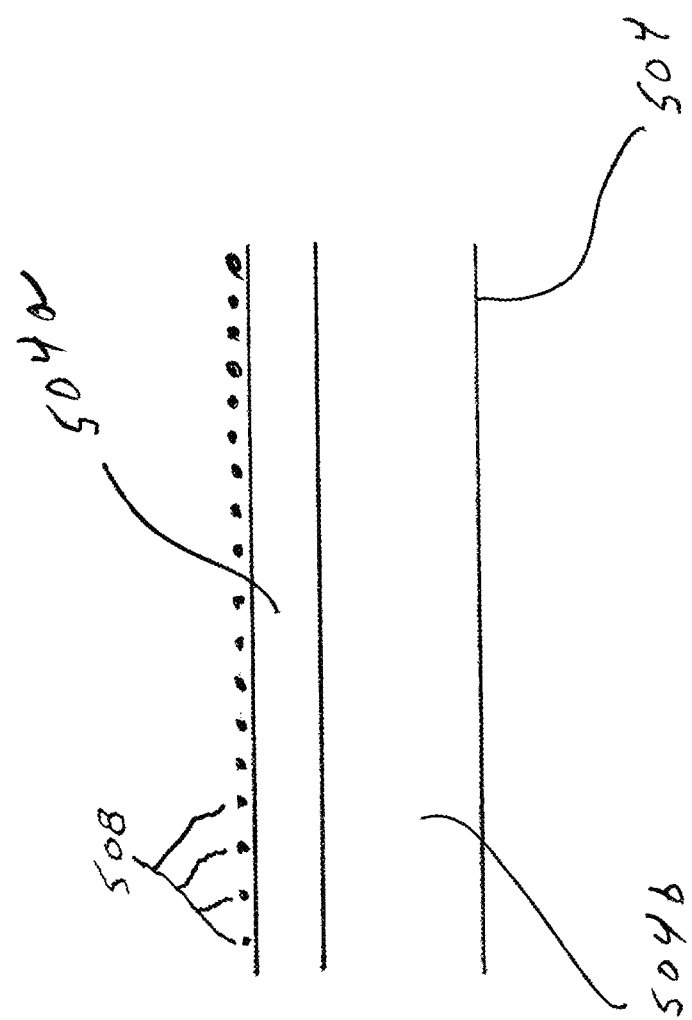
FIG. 16b shows an exploded or enlarged diagram of a part of the conveyor belt shown in FIG. 16a, according to some embodiments of the present invention.

FIGS. 16a, 16b

FIGS. 16a and 16b shows some embodiment according to the present invention, e.g., consistent with that disclosed in the aforementioned PCT application no. PCT/US14/37823.

FIG. 16a shows apparatus generally indicated as 500 including a collection area or tank 502 having one or more collection surfaces 504 configured to contact with a mixture 506 having water and valuable material, the valuable material having a plurality of mineral particles 508 of interest; and a synthetic material 504a provided at least on the collection surfaces as shown in FIG. 16b, the synthetic material 504a having plurality of molecules with a siloxane functional group configured to attract the mineral particles 508 of interest to the collection surfaces 504.

In FIG. 16, the one or more collection surfaces 504 may form part of a conveyor belt also indicated as 504, as shown, that is driven through the collection area or tank 502, through a release area or tank 510, back through the collection area or tank 502, etc. As shown, the conveyor belt 504 is arranged on various pulleys 511 that may be driven by one or more motors (not shown) and configured with corresponding linkage (also not shown). Conveyor belts and conveyor belt systems are known in the art, and the scope of the invention is not intended to be limited to any particular type or kind thereof either now known or later developed in the future.

According to some embodiments of the present invention, the mixture 506 may include, or take the form of, a pulp slurry having ground ore with mineral particles of interest forming part thereof, including mineral particles of interest of about 500 microns or larger. According to some embodiments of the present invention, the mixture 506 may include chemistry configured to enhance the attraction and/or attachment between the synthetic material having the siloxane functional group and the mineral particles 508 of interest in the mixture 506. By way of example, the mixture 506 may include a hydrophobizing agent and/or polymeric collector, e.g., including polyethylenimine (PEI), although the scope of the invention is intended to include other types or kinds of hydrophobizing agents and/or polymeric collectors within the spirit of the present invention. By way of further example, embodiments are envisioned in which the mixture 506 may include Xanthate or Xanthate salt, which is otherwise known in the art to be used as a flotation and/or hydrophobic agent in mineral processing. The chemistry set forth herein is intended to include chemistry or chemistries that are both now known or later developed in the future.

According to some embodiments of the present invention, the collection area or tank 502 may be configured with one or more stirrers, mixers or agitators 512 for stirring, mixing or agitating the mixture 506. The release area or tank 510 may be configured with one or more broom-like devices 514 for sweeping and/or releasing in whole or in part attached mineral particles 508 of interest from the synthetic material 504a of the collection surfaces 504. Embodiments are envisioned in which the broom-like device 514 is configured on either or both sides of the conveyor belt 504. According to some embodiments of the present invention, the release area or tank 510 may have a corresponding mixture 516 configured to enhance the releasing in whole or in part of the attached mineral particles 508 of interest from the synthetic material 504a of the collection surfaces 504. As shown, the collection area or tank 502 and the release area or tank 510 are separated by a wall 518.

By way of example, the conveyor belt 504 may be made of polyurethane rubber indicated as 504b in FIG. 16b and coated with a silicone gel indicated as 504a for collecting the valuable material of interest of a wide range of sizes, including particles far larger than about 500 microns. After being coated on the polyurethane rubber 504b, the silicone gel 504a will cure and harden to as to form part of, and stick to, the polyurethane rubber 504b. Embodiments are envisioned in which the polyurethane rubber 504b may be coated on either or both sides with the silicone gel 504a. The scope of the invention is intended to include, and embodiments are envisioned in which, the conveyor belt 504 may be made of some other elastic material either now known or later developed in the future. The silicone gel 504a may include, or take the form of, molecules having the siloxane functional group, e.g., including a siloxane that is, or may take the form of, a functional group in organosilicon chemistry with the Si—O—Si linkage. By way of example, parent siloxanes may include, or take the form of, oligomeric and polymeric hydrides with the formulae $H(OSiH_2)_nOH$ and $(OSiH_2)_n$. The scope of the invention is also intended to include other types or kinds of siloxanes either now known or later developed in the future, e.g., including branched compounds, where the defining feature includes each pair of silicon centers being separated by one oxygen atom. In one embodiment of the present invention, and set forth by way of example, the silicone gel 504a took the form of a product from Dow-Corning® Corporation, Midland, Mich. 48686-0994, USA, e.g., labeled as product no. 2986922-1104 (Lot: 0007137499), that is sold in a combination that includes 3-4222 Dielectric Firm Gel Part A and 3-4222 Dielectric Firm Gel Part B. The gel comes with two parts: Part A includes dimethyl siloxane, dimethylvinyl-terminated—68083-19-2; polydimethylsiloxane—63148-62-9; reaction of ethylene glycol and silica—170424-65-4; hydrotreated light naphthenic petroleum distillate—64742-53-6. Part B includes dimethyl siloxane, dimethylvinyl-terminated—68083-19-2; polydimethylsiloxane—63148-62-9; dimethyl siloxane, hydrogen-terminated—none; trimethylated silica—68909-20-6; dimethyl, methylhydrogen siloxane—68037-59-2. The scope of the invention is intended to include, and embodiments are envisioned in which, the one or more collection surfaces 504 may be configured or made substantially of a material that consists of a siloxane-based material in a non-gel form.

PDMS

By way of example, PDMS is understood to be characterized by a chemical formula:

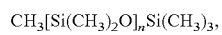

$$CH_3[Si(CH_3)_2O]_nSi(CH_3)_3,$$

where n is the number of repeating monomer $[SiO(CH_3)_2]$ units.

PDMS includes oxygen, hydrogen, silicon and carbon. Because of the presence of oxygen, PDMS is normally considered or classified as being part of a polar group. In chemistry, polarity is generally understood to refer to a separation of electric charge leading to a molecule or its chemical groups having an electric dipole or multipole moment, and a polar molecule is generally understood to have a polarity that is characterized as being asymmetric.

Alternatives to Conveyor Belt Embodiments

The scope of the invention is not intended to be limited to the collection surface 504 including, or taking the form of, a conveyor belt. For example, embodiments are envisioned in which the collection surface 504 includes, or takes the form of, one or more of an impeller, a filter assembly and/or a flat plate, as well as other types or kinds of collection surfaces either now known or later developed in the future, consistent with that set forth herein.

The Scope of the Invention

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow).

Although the invention has been described and illustrated with respect to exemplary embodiments thereof, the foregoing and various other additions and omissions may be made therein and thereto without departing from the spirit and scope of the present invention.

What is claimed is:
1. A transportable modular system for enhanced minerals recovery from tailings lines and deposits, comprising:

a plurality of trucks arranged to travel between a distribution point and at least one remote site;

at least two transportable mineral recovery modules, each transportable mineral recovery module configured for transporting as a truck mounted module to said at least one remote site as an independently-operable mineral recovery module by one of said plurality of trucks, each of the at least two transportable mineral recovery modules configured to couple to another one of the at least two transportable mineral recovery modules on-site at the remote site and used together to provide enhanced minerals recovery;

at least one of the at least two transportable mineral recovery modules comprising at least one central engineered polymer mineral recovery module configured to receive tailings fluid having a mineral particle of interest, process the tailings fluid using an engineered polymer configuration, and provide recovered mineral processing fluids having the mineral particle of interest and a tailings disposal fluid; and the at least two transportable mineral recovery modules comprising at least one other transportable mineral recovery module selected from a group of transportable mineral recovery modules that includes another central engineered polymer mineral recovery module, a tailings fluid management module, an additive/chemical treatment polymer management module, a tailings disposal module and a recovery mineral processing module, and wherein each of the tailings fluid management module, the additive/chemical treatment polymer management module, the tailings disposal module and the recovery mineral processing module is configured as an independently-operable module, wherein each transportable mineral recovery module comprises an input porting and an output porting, and wherein the output porting of any one of the transportable mineral recovery modules is configured to couple on-site to the input porting of another one of the transportable mineral recovery modules.

2. A transportable modular system according to claim 1, wherein each of the at least two transportable mineral recovery modules is configured as a respective plug-and-play transportable mineral recovery module for interconnecting and cooperating together to provide the enhanced minerals recovery.

3. A transportable modular system according to claim 1, wherein the tailings fluid management module comprises some combination of at least one pump or at least one pre-conditioner module, wherein the at least one pump is configured to provide the tailings fluid from a tailing pond or reservoir to the at least one central engineered polymer mineral recovery module, and wherein the at least one pre-conditioner module is configured to pre-condition the tailings fluid before the tailings fluid is provided to the at least one central engineered polymer mineral recovery module.

4. A transportable modular system according to claim 1, wherein the additive/chemical treatment polymer management module comprises at least one chemical storage vessel configured to provide at least one chemical to the at least one central engineered polymer mineral recovery module, wherein the at least one chemical comprises at least one chemical polymer, or at least one chemical additive, or at least one polymer reactivation, or some combination thereof.

5. A transportable modular system according to claim 1, wherein said at least one other transportable mineral recovery module comprises said another central engineered polymer mineral recovery module and a recovery mineral processing module, and said another central engineered polymer mineral recovering module is configured to provide the mineral particle of interest in the recovered mineral processing fluids to the recovery mineral processing module for further processing.

6. A transportable modular system according to claim 5, wherein the recovery mineral processing module comprises a recovered mineral processing fluids storage vessel to receive and store the recovered mineral processing fluids for further processing.

7. A transportable modular system according to claim 6, wherein the recovery mineral processing module is configured for transporting from the remote site with the recovered mineral processing fluids contained in the recovered mineral processing fluids storage vessel for further processing off-site at another location, including at a main plant.

8. A transportable modular system according to claim 1, wherein said another central engineered polymer mineral recovering module is configured to provide the tailings disposal fluid to the tailings disposal module for tailings disposal.

9. A transportable modular system according to claim 8, wherein the tailings disposal module comprises a pump configured to provide the tailings disposal fluid for tailings disposal.

10. A transportable modular system according to claim 8, wherein the tailings disposal module comprises a tailings disposal storage vessel to receive and store the tailings disposal fluid for tailings disposal, and wherein the tailings disposal module is configured for transporting from the remote site with the tailings disposal fluid contained in the tailings disposal storage vessel for tailings disposal off-site at another location.

11. A transportable modular system according to claim 1, wherein the engineered polymer configuration comprises apparatus having a collection area comprising collection surfaces configured to contact with a mixture comprising water and valuable material, the valuable material comprising a plurality of mineral particles; and a synthetic material provided at least on the collection surfaces, wherein the synthetic material comprises plurality of molecules comprising a functional group configured to attract the mineral particles to the collection surfaces, wherein the functional group is configured to render the collection surfaces hydrophobic and wherein the synthetic material comprises a siloxane derivative, and wherein the siloxane derivative comprises either polydimethylsiloxane or polysiloxanates or hydroxyl-terminated polydimethylsiloxanes; and the synthetic material is selected from a group consisting of hydrophobically-modified ethyl hydroxyethyl cellulose polysiloxanates, alkylsilane and fluoroalkylsilane.

12. A transportable modular system according to claim 1, wherein the engineered polymer configuration comprises apparatus having a collection area or tank having one or more collection surfaces configured to contact with a mixture having water and valuable material, the valuable material having a plurality of mineral particles of interest; and a synthetic material provided at least on the one or more collection surfaces, the synthetic material having plurality of molecules with a siloxane functional group configured to attract the mineral particles of interest to the collection surfaces.

13. A transportable modular system according to claim 1, wherein the engineered polymer configuration is made of polyurethane rubber and coated with a silicone gel for collecting the material particle of interest of a wide range of sizes, including particles far larger than about 500 microns.

14. A transportable modular system according to claim 13, wherein, after being coated on the polyurethane rubber, the silicone gel cures and hardens to as to form part of, and stick to, the polyurethane rubber.

15. A transportable modular system according to claim 13, the silicone gel includes, or takes the form of, molecules having the siloxane functional group, including a siloxane that is, or takes the form of, a functional group in organo-silicon chemistry with the Si—O—Si linkage, wherein the siloxane includes branched compounds, where the defining feature includes each pair of silicon centers being separated by one oxygen atom.

16. A transportable modular system according to claim 13, wherein parent siloxanes include, or take the form of, oligomeric and polymeric hydrides with the formulae $H(OSiH_2)_nOH$ and $(OSiH_2)_n$.

17. A transportable modular system according to claim 13, wherein the silicone gel is configured or made substantially of a material that consists of a siloxane-based material in a non-gel form.

18. A transportable modular system according to claim 1, wherein the engineered polymer configuration includes, or takes the form of, a group consisting of some combination of: engineered polymer bubble or beads, polymer filters, a polymer impeller arrangement, a polymer conveyor belt arrangement or a polymer flat plate arrangement.

19. A transportable modular system according to claim 1, wherein the engineered polymer configuration comprises a collection surface functionalized to be hydrophobic so as to provide a bonding between the collection surface and the mineral particle of interest that is hydrophobic.

20. A transportable modular system according to claim 1, wherein the engineered polymer configuration comprises a collection surface made of a polymer and coated with a silicone gel to provide the siloxane functional group.

21. A transportable modular system according to claim 20, wherein the polymer is naturally hydrophobic or functionalized to be hydrophobic.

22. A transportable modular system according to claim 20, wherein the polymer is a hydrophobic polymer, including a polydimethylsiloxane.

23. A transportable modular system according to claim 20, wherein the collection surface is rendered hydrophobic by having a coating that contains chemicals with a siloxane functional group.

24. A transportable modular system according to claim 20, wherein the collection surface is coated with hydrophobic silicone polymer including polysiloxane so that the collection surface becomes hydrophobic.

25. A transportable modular system according to claim 20, wherein the collection surface comprises polymer surfaces and the synthetic material comprise a siloxane derivative.

26. A transportable modular system according to claim 25, wherein the synthetic material comprises one or more of dimethyl siloxane, dimethylvinyl-terminated; polydimethylsiloxane; polysiloxanes; and dimethyl, methylhydrogen siloxane.

27. A transportable modular system according to claim 25, wherein the synthetic material comprises hydroxyl-terminated polydimethylsiloxanes.

28. A transportable modular system according to claim 25, wherein the polymer surfaces comprise polyurethane.

29. A transportable modular system according to claim 1, wherein the engineered polymer configuration comprises a collection surface having a polymer selected from a group consisting of polyamides, polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, and polydimethylsiloxane.

30. A transportable modular system according to claim 1, wherein the engineered polymer configuration comprises a collection surface having a polymer from a group consisting of polystyrene, poly(d,l-lactide), poly(dimethylsiloxane), polypropylene, polyacrylic, polyethylene, hydrophobically-modified ethyl hydroxyethyl cellulose polysiloxanes, alkyl-silane and fluoroalkylsilane.

31. A transportable modular system according to claim 1, wherein the engineered polymer configuration comprises a synthetic bead having a solid-phase body made of a synthetic material, the solid phase body comprising a surface; and a coating attached to at least part of the surface, the coating comprising a plurality of molecules selected for attracting one or more mineral particles to the molecules, wherein the molecules comprise a functional group in a hydrophobic polymer selected from a group consisting of poly(dimethylsiloxane), polysiloxanates, silicone alkyd copolymer and fluoroalkylsilane.

32. A transportable modular system according to claim 1, wherein each transportable mineral recovery module comprises a respective transportable frame or structure coupled thereto.

33. A transportable modular system according to claim 32, wherein each transportable mineral recovery module comprises one or more frame-to-transportable-mineral-recovery-module coupling members configured for coupling together the respective transportable frame or structure to a corresponding transportable mineral recovery module.

34. A transportable modular system according to claim 33, wherein the one or more frame-to-transportable-mineral-recovery-module coupling members is configured as a rigid structure like mounting bars, tubes or rods that securely couple some part of the respective transportable frame or structure to some part of the corresponding transportable mineral recovery module, wherein the rigid structure is configured as one or more removable fastening mounting bars, tubes or rods or is configured as one or more non-removable mounting bars, tubes or rods, including by welding the mounting bars, tubes or rods between some part of the transportable frame or structure and some part of the transportable mineral recovery module.

35. A transportable modular system for enhanced minerals recovery from tailings lines and deposits, comprising:
a plurality of trucks arranged to travel between a distribution point and at least one remote site,
at least two transportable mineral recovery modules,
each transportable mineral recovery module configured for transporting as a truck mounted module to said at least one remote site as an independently-operable mineral recovery module by one of said plurality of trucks,
each of the at least two transportable mineral recovery modules configured to couple to another one of the at least two transportable mineral recovery module on-site at the remote site and used together to provide enhanced minerals recovery; and
the at least two transportable mineral recovery modules selected from a group of transportable mineral recovery modules that consists of a central engineered polymer mineral recovery module, a tailings fluid management module, an additive/chemical treatment polymer management module, a recovery mineral processing module and a tailings disposal module, wherein each of the tailings fluid management module, the additive/chemical treatment polymer management module, the tailings disposal module and the recovery mineral processing module is configured as an independently-operable module, wherein each transportable mineral recovery module comprises an input porting and an output porting, and wherein the output porting of any one of the transportable mineral recovery modules is configured to couple on-site to the input porting of another one of the transportable mineral recovery modules.

36. A transportable modular system according to claim 35, wherein at least one of the at least two transportable mineral recovery modules comprises at least one central engineered polymer mineral recovery module configured to:
receive tailings fluid having a mineral particle of interest,
process the tailings fluid using an engineered polymer configuration, and
provide recovered mineral processing fluids having the mineral particle of interest and a tailings disposal fluid.

37. A transportable modular system according to claim 36, wherein the tailings fluid management module is configured to provide the tailings fluid to the at least one central engineered polymer mineral recovery module.

38. A transportable modular system according to claim 36, wherein the engineered polymer configuration includes, or takes the form of, a group consisting of some combination of: engineered polymer bubble or beads, polymer filters, a polymer impeller arrangement, a polymer conveyor belt arrangement or a polymer flat plate arrangement.

39. A transportable modular system according to claim 37, wherein the recovery mineral processing module is configured to receive the recovered mineral processing fluids having the mineral of interest and the tailings disposal fluid, the recovery mineral processing module further configured to receive a chemical additive from the additive/chemical treatment polymer management module independently of the tailing fluid management module.

40. A transportable modular system according to claim 1, wherein said at least one central engineered polymer mineral processing module is configured to receive the tailing fluids having the mineral particle of interest from the tailings fluid management module, and to receive a chemical additive from the additive/chemical treatment polymer management module independently of the tailing fluid management module.

41. A transportable modular system according to claim 1, further comprising a plurality of vehicles, each vehicle arranged to mount at least one of the transportable mineral recovery modules.

42. A method for enhancement of mineral recovery from tailings lines and deposits, comprising:
providing a plurality of transportable mineral recovery modules, each transportable mineral recovery module configured for transporting as a vehicle mounted module to a remote site as an independently-operable mineral recovery module, and
providing a plurality of vehicles, each vehicle arranged to mount at least one of the transportable mineral recovery modules from a distribution point to the remote site, wherein the plurality of transportable mineral recovery modules comprise:
one central engineered polymer mineral recovery module configured to
receive tailings fluid having a mineral particle of interest,
process the tailings fluid using an engineered polymer configuration, and
provide recovered mineral processing fluids having the mineral particle of interest and a tailings disposal fluid; and
at least one other transportable mineral recovery module selected from a group of transportable mineral recovery modules that includes another central engineered polymer mineral recovery module, a tailings fluid management module, an additive/chemical treatment polymer management module, a tailings disposal module and a recovery mineral processing module, and wherein said one central engineered polymer mineral recovery module is coupled to said at least one other module on-site at the remote site and used together to provide enhanced mineral recovery, and wherein each of the tailings fluid management module, the additive/chemical treatment polymer management module, the tailings disposal module and the recovery mineral processing module is configured as an independently-operable module, wherein each transportable recovery module comprises an input porting and an output porting, and wherein the output porting of any one of the transportable mineral recovery modules is configured to couple on-site to the input porting of another one of the transportable mineral recovery modules.

43. A method according to claim 42, wherein said one central engineered polymer mineral recovery module is configured to receive the tailings fluid having a mineral particle of interest from the tailings fluid management module on-site at the remote site.

44. A method according to claim 43, wherein said one central engineered polymer mineral recovery module is also configured to receive at least one chemical from the additive/chemical treatment polymer management module independently from the tailings fluid management module on-site at the remote site.

45. A method according to claim 44, wherein said one central engineered polymer mineral recovery module is also configured to provide the mineral particle of interest to the recovery mineral processing module and to provide the tailings disposal fluid to tailing disposal module on-site at the remote site.

46. A method according to claim 42, wherein said at least one of the transportable mineral recovery modules is installed on said each vehicle from a location different from the remote site, said method further comprising
uninstalling said at least one of the transportable mineral recovery modules from said each vehicle at the remote site for providing the enhanced mineral recovery.

47. A method according to claim 46, further comprising reloading said at least one of the transportable mineral recovery modules on said each vehicle at the remote site after providing the enhanced mineral recovery.

48. A method according to claim 42, wherein said one central engineered polymer mineral recovery module and said at least one other module are installed on the vehicles at one or two locations different from the remote site, said method further comprising:
uninstalling said one central engineered polymer mineral recovery module and said at least one other module at the remote site from the vehicles; and coupling said one central engineered polymer mineral recovery module to said at least one other module at the remote site for providing the enhanced mineral recovery.

49. A method according to claim 48, further comprising reloading said one central engineered polymer mineral recovery module and said at least one other module on the vehicles at the remote site; and moving said one central engineered polymer mineral recovery module to said at least one other module from the remote site.

50. A method according to claim 42, wherein the tailings fluid management module is configured to provide the tailings fluid to said one central engineered polymer mineral recovery module.

51. A method according to claim 50, wherein the additive/chemical treatment polymer management module comprises at least one chemical storage vessel configured to provide at least one chemical to said one central engineered polymer mineral recovery module.

52. A method according to claim 51, wherein the recovery mineral processing module is configured to receive the recovered mineral processing fluids having the mineral particle of interest for further processing.

53. A method according to claim 52, wherein the tailings disposal module is configured to receive the tailings disposal fluid for tailings disposal.

\* \* \* \* \*